(12) United States Patent
Holcomb et al.

(10) Patent No.: US 12,731,499 B2
(45) Date of Patent: Sep. 8, 2026

(54) DETECTING OBJECTS AND DISTANCE TO OBJECTS FOR ROTORCRAFT ROTOR STRIKE AVOIDANCE

(71) Applicant: Textron Innovations Inc., Providence, RI (US)

(72) Inventors: Jeffrey W. Holcomb, Fort Worth, TX (US); Kristen Doelling, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 19 days.

(21) Appl. No.: 18/521,842

(22) Filed: Nov. 28, 2023

(65) Prior Publication Data

US 2025/0174139 A1 May 29, 2025

(51) Int. Cl.

*G08G 5/80* (2025.01)
*B64D 45/08* (2006.01)
*G06T 7/55* (2017.01)
*G06T 7/70* (2017.01)
*G06V 10/764* (2022.01)
*G06V 20/50* (2022.01)
*B64C 27/04* (2006.01)

(52) U.S. Cl.

CPC ............... *G08G 5/80* (2025.01); *B64D 45/08* (2013.01); *G06T 7/55* (2017.01); *G06T 7/70* (2017.01); *G06V 10/764* (2022.01); *G06V 20/50* (2022.01); *B64C 27/04* (2013.01); *G06T 2207/20081* (2013.01); *G06T 2207/30252* (2013.01)

(58) Field of Classification Search

None

See application file for complete search history.

(56) References Cited

U.S. PATENT DOCUMENTS

2018/0351634 A1 12/2018 Ryan et al.
2020/0074870 A1* 3/2020 Tillotson .................. G08G 5/80
2020/0109954 A1 4/2020 Li et al.
2024/0404296 A1* 12/2024 Sah ........................ G06V 20/58

FOREIGN PATENT DOCUMENTS

WO 2023069537 A1 4/2023

* cited by examiner

*Primary Examiner* — Samira Monshi
(74) *Attorney, Agent, or Firm* — Slater Matsil, LLP

(57) ABSTRACT

In certain embodiments, a method includes accessing image information generated by one or more image sensors configured to generate the image information for a surrounding environment of a rotorcraft. The method includes causing one or more AI models to process the image information to generate proximity information for the image information. The proximity information includes depth measurements for one or more image objects from the image information that correspond to one or more physical objects in the surrounding environment of the rotorcraft. The method includes initiating, in response to generating the proximity information from the image information, further analysis of the proximity information for the one or more image objects to facilitate avoiding, based on the proximity information, a collision of a rotor blade of the rotorcraft with the one or more physical objects that correspond to the one or more image objects.

20 Claims, 15 Drawing Sheets

118
104b
104
104a
100
108
122
132
128
110
116
112
121
130
102
106
121
120
124
126
125
114
136
134

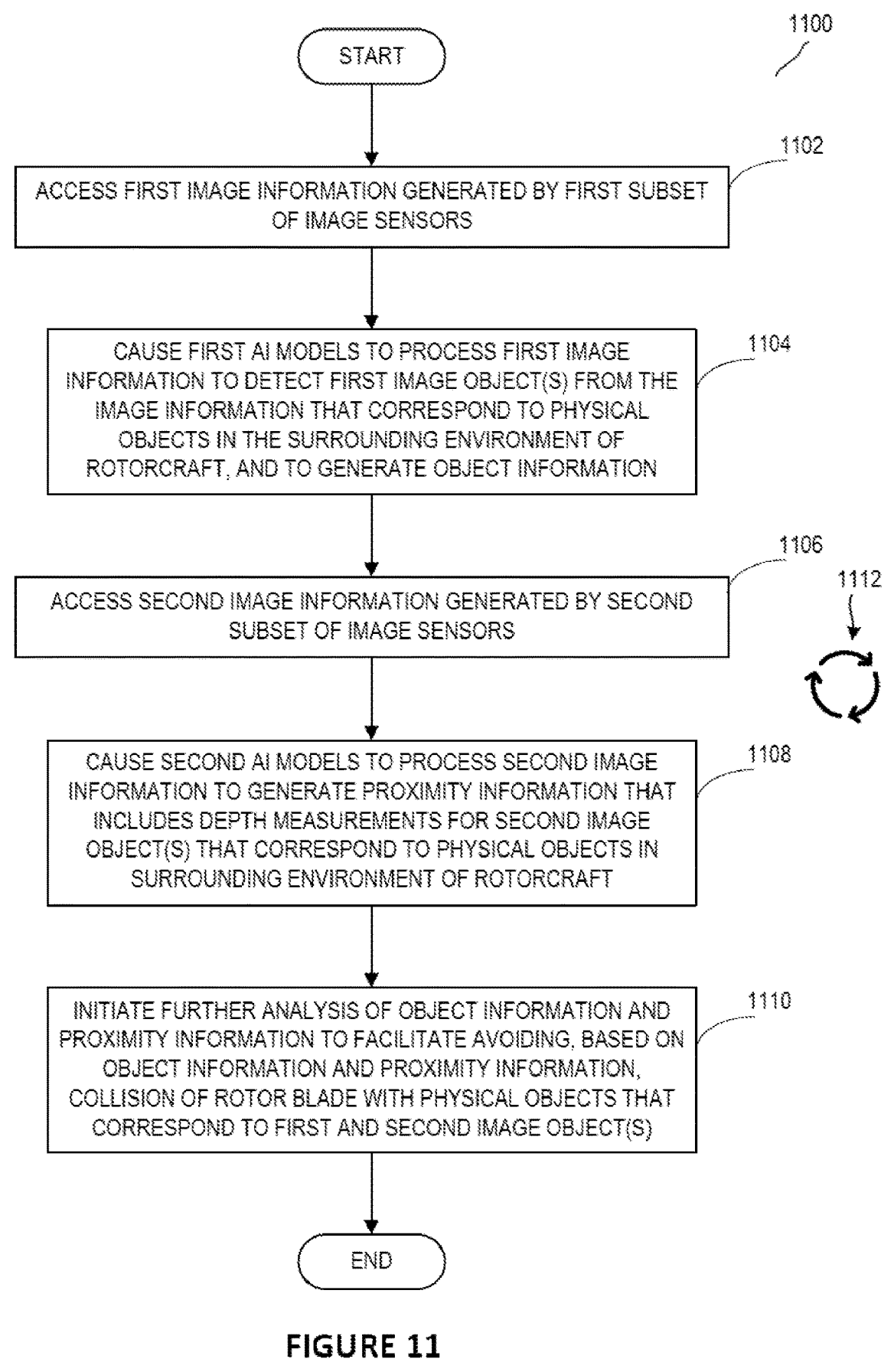

1100

START

1102 ACCESS FIRST IMAGE INFORMATION GENERATED BY FIRST SUBSET OF IMAGE SENSORS

1104 CAUSE FIRST AI MODELS TO PROCESS FIRST IMAGE INFORMATION TO DETECT FIRST IMAGE OBJECT(S) FROM THE IMAGE INFORMATION THAT CORRESPOND TO PHYSICAL OBJECTS IN THE SURROUNDING ENVIRONMENT OF ROTORCRAFT, AND TO GENERATE OBJECT INFORMATION

1106 ACCESS SECOND IMAGE INFORMATION GENERATED BY SECOND SUBSET OF IMAGE SENSORS

1112

1108 CAUSE SECOND AI MODELS TO PROCESS SECOND IMAGE INFORMATION TO GENERATE PROXIMITY INFORMATION THAT INCLUDES DEPTH MEASUREMENTS FOR SECOND IMAGE OBJECT(S) THAT CORRESPOND TO PHYSICAL OBJECTS IN SURROUNDING ENVIRONMENT OF ROTORCRAFT

1110 INITIATE FURTHER ANALYSIS OF OBJECT INFORMATION AND PROXIMITY INFORMATION TO FACILITATE AVOIDING, BASED ON OBJECT INFORMATION AND PROXIMITY INFORMATION, COLLISION OF ROTOR BLADE WITH PHYSICAL OBJECTS THAT CORRESPOND TO FIRST AND SECOND IMAGE OBJECT(S)

END

FIGURE 11

DETECTING OBJECTS AND DISTANCE TO OBJECTS FOR ROTORCRAFT ROTOR STRIKE AVOIDANCE

TECHNICAL FIELD

This disclosure relates generally to aircraft, and, in particular embodiments, to detecting objects and distance to objects for rotorcraft rotor strike avoidance.

BACKGROUND

Vehicles, such as aircraft, can be extremely difficult to pilot. For example, vehicles may encounter objects that are difficult to detect with the human eye and/or with other environmental detection systems, which may increase the risk of collision or other problems.

SUMMARY

In certain embodiments, a rotorcraft includes a fuselage and a rotor system that includes a rotor blade coupled to a rotor mast mounted to the fuselage. The rotorcraft includes one or more image sensors configured to generate image information for a surrounding environment of the rotorcraft, at least one processor, and at least one non-transitory computer-readable storage medium storing a program for execution by the at least one processor. The program includes instructions to access first image information generated by a first subset of the one or more image sensors, and to cause a first one or more artificial intelligence (AI) models to process the first image information to detect one or more first image objects from the first image information that correspond to physical objects in the surrounding environment of the rotorcraft. The first one or more AI models are configured to generate object information that includes respective image locations and respective object-type classifications for the first one or more image objects detected from the first image information. The program includes instructions to initiate, in response to detecting the one or more first image objects from the image information, further analysis of object information for the one or more first image objects to facilitate avoiding, based on the object information, a collision of the rotor blade with the one or more first physical objects that correspond to the one or more first image objects.

In certain embodiments, a method includes accessing image information generated by one or more image sensors configured to generate the image information for a surrounding environment of a rotorcraft. The method includes causing one or more AI models to process the image information to generate proximity information for the image information. The proximity information includes depth measurements for one or more image objects from the image information that correspond to one or more physical objects in the surrounding environment of the rotorcraft. The method includes initiating, in response to generating the proximity information from the image information, further analysis of the proximity information for the one or more image objects to facilitate avoiding, based on the proximity information, a collision of a rotor blade of the rotorcraft with the one or more physical objects that correspond to the one or more image objects.

In certain embodiments, a system includes at least one processor and at least one non-transitory computer-readable storage medium storing at least one artificial intelligence model and storing a program for execution by the at least one processor. The program includes instructions to access image information generated by one or more image sensors, the image information for a surrounding environment of a rotorcraft. The program includes instructions to cause one or more AI models to process the image information to detect one or more image objects from the image information that correspond to physical objects in the surrounding environment of the rotorcraft. The one or more AI models are configured to generate object information including respective image locations and respective object-type classifications for the one or more image objects detected from the image information. The program includes instructions to initiate, in response to detecting the one or more image objects from the image information, further analysis of object information for the one or more image objects to facilitate avoiding, based on the object information, a collision of a rotor blade of the rotorcraft with the one or more physical objects that correspond to the one or more image objects.

BRIEF DESCRIPTION OF THE DRAWINGS

For a more complete understanding of this disclosure, and advantages thereof, reference is now made to the following descriptions taken in conjunction with the accompanying drawings, in which:

FIG. 11 illustrates a flow diagram of an example method for detecting objects and distance to objects for rotorcraft rotor strike avoidance, according to certain embodiments;

DETAILED DESCRIPTION OF ILLUSTRATIVE EMBODIMENTS

Piloting a rotorcraft is a mentally demanding process. For example, a pilot not only considers the area occupied by the fuselage of the rotorcraft, but also the area occupied by one or more rotors that each include one or more rotor blades. To ensure safe navigation of the rotorcraft, a pilot maintains near constant awareness of the operation of the rotorcraft, making frequent and continuous adjustments to the flight operations. It can be difficult for the pilot to observe collision hazards, including those collision hazards that have low visibility. Examples of these low-visibility collision hazards may include fences, powerlines, other elevated wires, spinning objects (e.g., rotor blades of other rotorcraft, windmills, etc.), poles, trees, and/or other objects. Many low-visibility objects are difficult or impossible to detect even using certain modern radar or other image sensing techniques.

The combination of low visibility of certain objects and the mental strain of flying a helicopter may lead to rotor blade strikes—that is, collisions of rotor blades of the rotorcraft with one or more objects in an environment in which the rotorcraft is operating. Many of these rotor blade strikes are fatal.

Certain embodiments of this disclosure relate to detecting objects and distance to objects for rotorcraft rotor strike avoidance. Certain embodiments of this disclosure provide techniques that use artificial intelligence (AI) models to detect objects and distance to objects for rotorcraft rotor strike avoidance. These AI models may process image information collected by one or more sensors positioned at various locations of the rotorcraft (and potentially elsewhere) to detect objects and distance to objects for rotorcraft rotor strike avoidance. These AI models may be specially trained to detect and/or determine distance to certain types of objects, including for example low-visibility objects, which may reduce or eliminate rotor strike incidents. The AI models may provide object information and/or proximity information to collision avoidance logic, which may analyze the object information and/or proximity information, and initiate a remedial action, if appropriate.

This disclosure primarily describes an example of a rotorcraft (e.g., helicopter); however, this disclosure may apply to any suitable type of aircraft or even other types of vehicles or other machines for which detecting objects and distances to objects to facilitate safe navigation may be useful.

Figure 1:
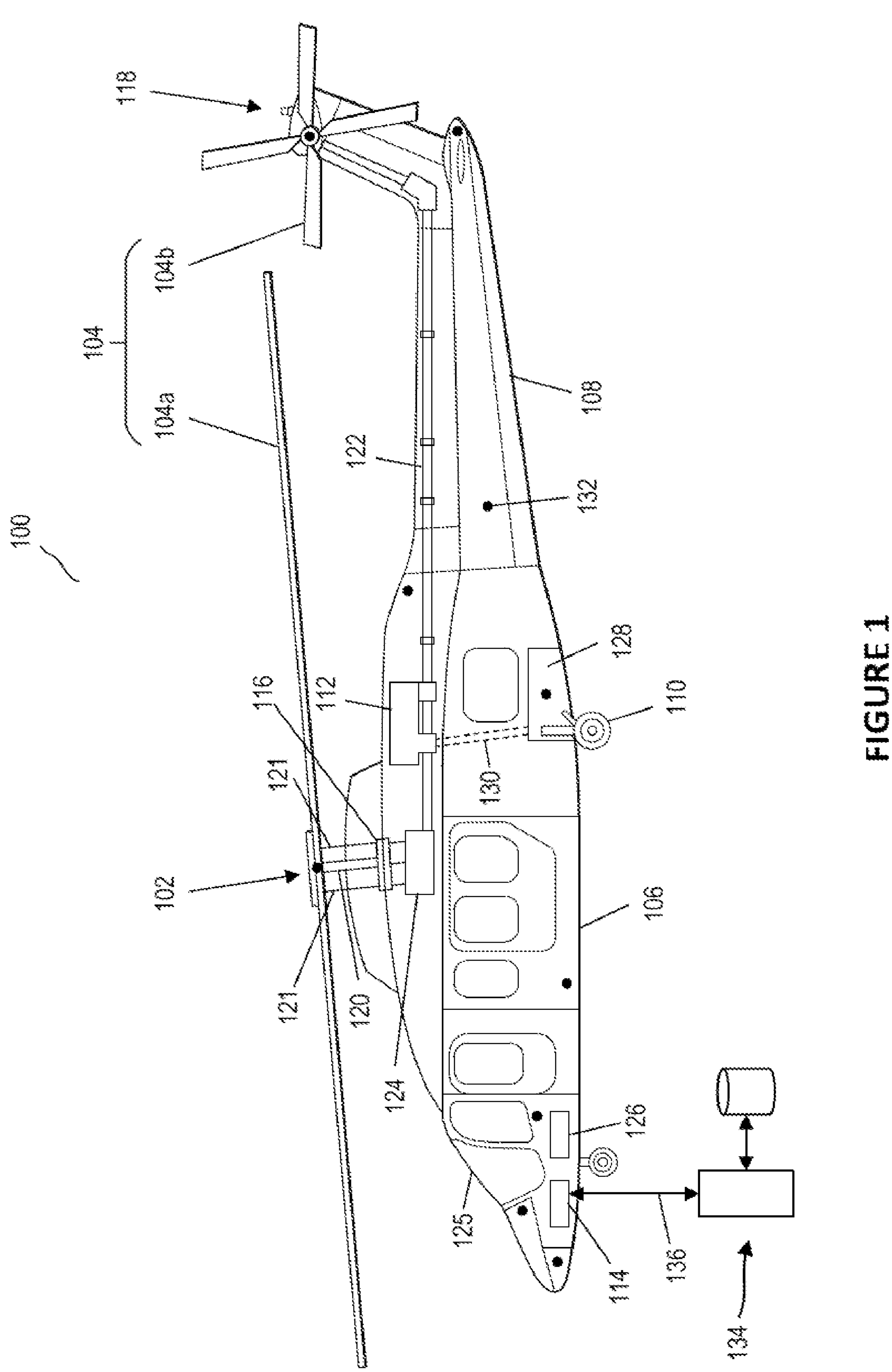
FIG. 1 illustrates aspects of an example rotorcraft, according to certain embodiments.

FIG. 1 illustrates aspects of an example rotorcraft 100, according to certain embodiments. It should be appreciated that some of teachings from rotorcraft 100 may apply to aircraft other than rotorcraft, such as airplanes, tilt rotor aircraft, unmanned aircraft, and the like. Rotorcraft 100 includes a main rotor system 102, rotor blades 104, a fuselage 106 (also referred to as an airframe), a tail section 108, landing gear 110, multiple engines 112, and one or more aircraft computer systems 114.

Main rotor system 102 includes main rotor blades 104*a*. The pitch of each main rotor blade 104*a* may be controlled by a swashplate 116 to selectively control the attitude, altitude and movement of rotorcraft 100. Swashplate 116 may be used to collectively and/or cyclically change the pitch of main rotor blades 104*a*.

Rotorcraft 100 also has an anti-torque system, which may include a tail rotor, no-tail-rotor (NOTAR), or dual main rotor system. In the illustrated example, rotorcraft 100 includes tail rotor 118 having tail rotor blades 104*b*. The pitch of each tail rotor blade 104*b* may be collectively changed to vary thrust of the anti-torque system, providing directional control of rotorcraft 100. The pitch of tail rotor blades 104*b* may be changed by one or more tail rotor actuators.

Power is supplied to main rotor system 102 to rotate main rotor blades 104*a* and/or to tail rotor 118 to rotate tail rotor blades 104*b* using one or more engines 112. For example, engines 112 may supply an output (e.g., torque) to rotor mast 120 via drive shaft 122, which is mechanically and operatively coupled to main rotor system 102 through a main rotor transmission 124, to rotate main rotor blades 104*a*. As another example, engines 112 may supply an output (e.g., torque) to tail rotor 118 via drive shaft 122, which is mechanically and operatively coupled to tail rotor 118 through a tail rotor transmission, to rotate tail rotor blades 104*b*. Engines 112, rotor mask 120, and drive shaft 122 may form at least a portion of what may be referred to as a powertrain of rotorcraft 100, and the powertrain may be configured to rotate main rotor blades 104*a* and/or tail rotor blades 104*b*.

Although this disclosure contemplates engines 112 being implemented in any suitable manner, in certain embodiments, engines 112 may be gas turbine (e.g., turboshaft) engines. In a particular example, rotorcraft 100 includes a pair of engines 112, which may be referred to as twin turbine engines.

Fuselage 106 represents the body of rotorcraft 100 and is coupled to the powertrain such that the powertrain and rotor blades 104 move fuselage 106 through the air during operation. Fuselage 106 includes a cockpit 125, which includes displays, controls, and instruments. Although rotorcraft 100 is depicted as having certain illustrated features, rotorcraft 100 may have a variety of implementation-specific configurations. For example, in certain embodiments, cockpit 125 is configured to accommodate a pilot or a pilot and co-pilot (and/or additional crew), as illustrated. This disclosure contemplates, however, that rotorcraft 100 may be operated remotely, in which case cockpit 125 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other embodiments, rotorcraft 100 could be configured as an unmanned vehicle, in which case cockpit 125 could be eliminated entirely to save space and cost.

Landing gear 110 (e.g., wheels, rails, or the like) supports rotorcraft 100 when rotorcraft 100 is grounded. Tail section 108 represents the tail section of rotorcraft 100 and is connected to tail rotor 118/tail rotor blades 104*b*. The tail section 108 may have other flight control devices such as horizontal or vertical stabilizers, rudder, elevators, or other control or stabilizing surfaces that are used to control or stabilize flight of rotorcraft 100. The powertrain and tail rotor blades 104*b* may collectively provide thrust in the same direction as the rotation of main rotor blades 104*a*, so as to counter torque effects created by main rotor blades 104*a*.

Rotorcraft 100 includes flight control devices operable to change the flight characteristics of rotorcraft 100. The flight control devices can be part of the powertrain, main rotor system 102, rotor blades 104, fuselage 106, and the like. The flight control devices include mechanical and/or electrical systems operable to change, e.g., the positions or angle of attack of rotor blades 104, the power output of engines 112, and the like. In certain embodiments, the flight control devices include a swashplate 116 or other device for collectively or cyclically controlling the pitch of each of main rotor blades 102*a* to selectively control direction, thrust, and lift of rotorcraft 100. In certain embodiments, the flight control devices include a tail rotor actuator for collectively controlling the pitch of tail rotor blades 104*b* to selectively control yaw of rotorcraft 100. In certain embodiments, the flight control devices include an engine control computer for selectively varying the power output of engines 112. Other examples of flight control devices include horizontal or vertical stabilizers, rudder, elevators, or other control or stabilizing surfaces that are used to control or stabilize flight of rotorcraft 100.

Aircraft computer systems 114 include any of the computers that operate to collect and/or analyze data related to rotorcraft 100 or its environment, control operation of one or more components of rotorcraft 100, or perform other suitable operations. Aircraft computer systems 114 may include flight control computers, cockpit display unit(s), the aforementioned engine control computers, and/or other processing devices. In certain embodiments, aircraft computer systems 114 are operable to collect data about, or control flight of, rotorcraft 100. Rotorcraft 100 may be a fly-by-wire (FBW) rotorcraft, and aircraft computer systems 114 include flight control computers operable to execute one or more control laws (CLAWS) that control flight of rotorcraft 100. For example, aircraft computer systems 114 can send electrical signals to engines 112, the actuators for swashplate 116, the tail rotor actuators, or the like to control flight of rotorcraft 100. Aircraft computer systems 114 may be operable to perform sensor data collection and analysis as part of a health and usage monitoring system (HUMS), a flight control system, a sensor system, a monitoring system, or the like.

Although aircraft computer systems 114 are shown to be a part of rotorcraft 100, this disclosure contemplates some or all of the processing devices that make up aircraft computer systems 114 being located on or remote from rotorcraft 100. In the case of some or all of the processing devices that make up aircraft computer systems 114 being located remote from rotorcraft 100, such processing devices may communicate with rotorcraft 100 (e.g., processing devices located on rotorcraft 100) using a suitable wireless communication technology.

Rotorcraft 100 includes power supply system 126, which may include one or more batteries of any suitable type. Power supply system 126 is configured to provide electrical power to power electrical components of rotorcraft 100, such as to aircraft computer systems 114 and/or other flight control devices (e.g., switches, actuators, etc.).

Rotorcraft 100 includes fuel system 128, which may include one or more fuel cells/tanks, one or more fuel lines 130, and other components for distributing fuel to other appropriate components of rotorcraft 100, such as to engines 112.

Rotorcraft 100 includes one or more image sensors 132 positioned throughout rotorcraft 100. Image sensors 132 are shown in FIG. 1 as solid-filled black dots, with only one instance labeled to avoid overcrowding FIG. 1 with additional labels. Although image sensors 132 are shown in particular locations of rotorcraft 100, image sensors 132 may be positioned at any suitable locations of rotorcraft.

Image sensors 132 are devices that collect and convey information for generating an image of at least a portion of a surrounding environment of rotorcraft 100. Image sensors 132 are configured to generate image information of a surrounding environment of rotorcraft 100. Image sensors 132 may collect image information and generate one or more output signals such as electrical signals, data elements, or the like, that indicate the image information. Image sensors 132 may produce new information on a regular or continuous basis, or at any other suitable interval. The image information may be associated with images captured by one or more image sensors 132 of at least a portion of the surroundings of rotorcraft 100, such as during actual operation of rotorcraft 100. Image sensors 132 may have respective fields of view. An image sensor 132 may generate image information for a region of the surrounding environment of rotorcraft 100 that falls within the field of view of that image sensor 132. In certain embodiments, some or all of the respective fields of view of image sensors 132 may overlap partially or entirely.

A sensor 132 itself and/or another suitable component (e.g., aircraft computer system 114 and computer system 134) may perform certain pre-processing on the data signal to generate the image information. In certain embodiments, data signals (e.g., output signals 423) from image sensors 132 may include substantially real-time images taken by image sensors 132 during operation of rotorcraft 100.

One or more of image sensors 132 may include a camera for capturing image information. In certain embodiments, one or more of image sensors 132 may be a self-contained system that includes, for example, a camera, a light source, and a processor for processing image data collected using a camera of the image sensor 132. Image sensors 132 may include, as examples, any suitable combination of vision sensors, LIDAR sensors, infrared (IR) sensors, multispectral sensors, radio frequency (RF) imaging, optical sensors, time-of-flight (ToF) sensors, or any other suitable type of image sensor. The types of sensor measurements made by image sensors 132 and/or interpreted from sensor measurements may include intensity information, time information, distance information (e.g., for depth measurements), or any other suitable types of measurements. In certain embodiments, an image sensor 132 may measure information for each of a number of pixels, as determined by the resolution of the image sensor 132.

Image sensors 132 of rotorcraft 100 may vary in type depending on the particular measurements being made by a given image sensor 132 and the associated capabilities of a given image sensor 132. For example, certain image sensors 132 may simply record and report measurements, while other image sensors 132 may have additional process abilities for processing measurements. As another example, certain types of image sensors 132 may generate image information that is more suitable for object detection while other types of image sensors 132 may generate image information that is more suitable for proximity analysis.

Although rotorcraft 100 is illustrated and described as including a particular number of image sensors 132, rotorcraft 100 may include any suitable number of image sensors 132, including one or more. Additionally, although rotorcraft 100 is illustrated and described as including particular types of image sensors 132, rotorcraft 100 may include any suitable types of image sensors 132 in any suitable combination. Additionally, this disclosure contemplates one or more image sensors 132 being remote from rotorcraft 100 and being able to detect information about rotorcraft 100 remotely.

Rotorcraft 100 also may communicate with one or more external computer systems 134. That is, computer system 114 may be located on board rotorcraft 100, and computer system 134 may be located off board rotorcraft 100. Computer system 134 may include any suitable processing device. In certain embodiments, computer system 134 is a server system. Computer system 134 may include a storage module, which may be implemented, for example, as a database. The database may be a relational database, such as a structured query language (SQL) database, or may be a non-relational database, such as a key-value store.

Computer system 114 and computer system 134 may be implemented using any suitable combination of hardware, firmware, and software. In certain embodiments, aircraft computer system 114 and computer system 134 may individually or collectively be implemented using a computer system such as the example described below with reference to FIG. 14.

Aircraft computer system 114 and computer system 134 may communicate via one or more links 136. Links 136 may include any suitable combination of wired or wireless communication links, such as any suitable combination of an Ethernet connection, a Wi-Fi connection, a cellular connection, a satellite link, an aircraft communications addressing and reporting system (ACARS) link, or the like.

Aircraft computer system 114 and/or computer system 134 may be configured to detect objects and distances to objects to facilitate avoiding a rotor strike between a rotor (e.g., rotor blades 104) of rotorcraft 100 and the objects. Aircraft computer system 114 and/or computer system 134 may cause the information obtained from image sensors 132 to be processed by one or more AI models to facilitate avoiding a rotor strike collision with one or more physical objects in the surrounding environment of rotorcraft 100.

For example, aircraft computer system 114 and/or computer system 134 may access image information generated by one or more image sensors 132 and cause one or more AI models to process the image information to detect one or more image objects from the image information. The one or more image objects may be objects in the image information that correspond to physical objects in the surrounding environment of rotorcraft 100. The one or more AI models may be configured to generate object information that includes respective image locations and respective object-type classifications for the one or more image objects detected from the image information.

As another example, aircraft computer system 114 and/or computer system 134 may access image information generated by one or more image sensors 132 and cause one or more AI models to process the image information to generate proximity information for the image information. The proximity information may include depth measurements for one or more image objects from the image information that correspond to one or more physical objects in the surrounding environment of rotorcraft 100.

Certain objects may be particularly difficult to detect, whether due to the relatively small size of the objects, the color of the objects, positions of the objects, a property in which the object blends in with surroundings of the object, or for other reasons. Such objects may be referred to as low-visibility objects, examples of which are described below.

Figures 2A, 2B:
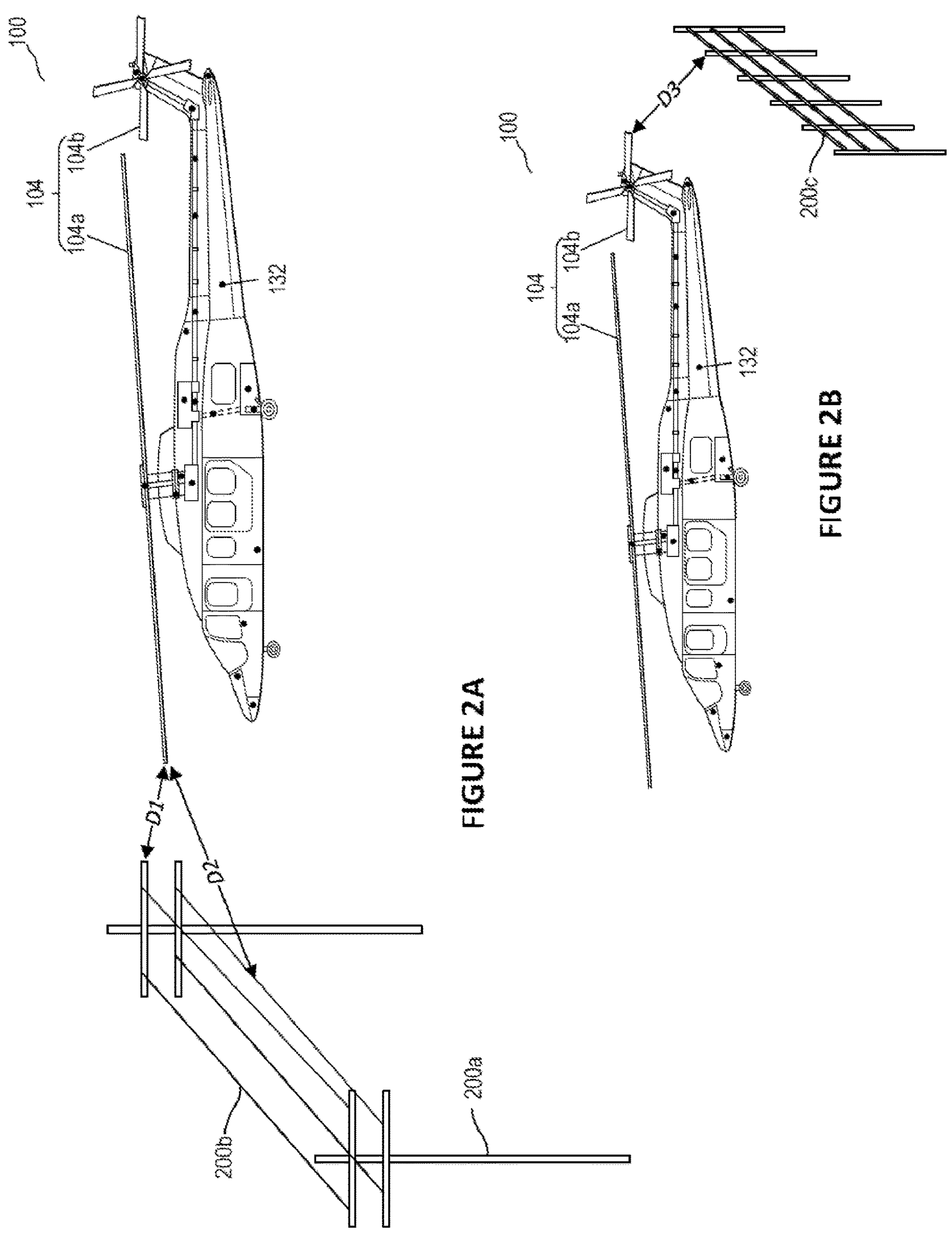
FIGS. 2A-2C illustrate example objects that may be low-visibility objects, according to certain embodiments.
Figure 2C:
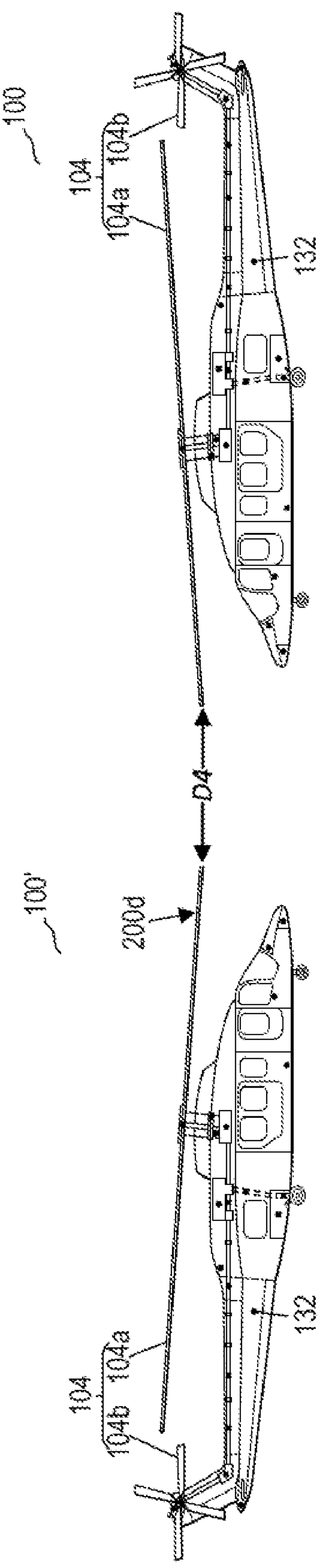

FIGS. 2A-2C illustrate example objects 200 that may be low-visibility objects, according to certain embodiments. Objects 200 are physical objects that may be present in the surrounding environment of rotorcraft 100. Each of these examples is described below. Although particular examples of objects 200 are described, this disclosure contemplates any suitable objects 200 existing in a surrounding environment of rotorcraft 100.

FIG. 2A illustrates objects **200*a* and 200*b*. Objects 200*a* are power line poles, while objects 200*b* are power lines. Both objects 200*a* and 200*b* may be difficult to detect and may present a heightened risk of rotor strike. For example, objects 200*a* and 200*b* may present an increased risk of collision with one or more of rotor blades 104 of rotorcraft 100. As illustrated in FIG. 2A, rotor blades 104*a* are separated from at least one portion of power line poles of object 200*a* by a distance D1 and from at least one of the power lines of object 200*b* by a distance D2. At some point, one or more of distances D1 or D2 may become so small as to be unsafe according to parameters defined by a collision avoidance system (or other suitable system) of rotorcraft 100. Although shown to be a distance between an object 200 and a rotor blade 104, in certain embodiments rotorcraft 100 may track distances to objects 200 from one or more locations of rotorcraft 100**.

FIG. 2B illustrates object **200*c*, which is a fence. Object 200*c* may be difficult to detect and may present a heightened risk of rotor strike. For example, object 200*c* may present an increased risk of collision with one or more of rotor blades 104 of rotorcraft 100. As illustrated in FIG. 2B, tail rotor blades 104*b* are separated from at least one portion of the fence of object 200*c* by a distance D3. At some point, distance D3 may become so small as to be unsafe according to parameters defined by a collision avoidance system (or other suitable system) of rotorcraft 100**.

FIG. 2C illustrates object **200*d*, which is main rotor blade 104*a* of another rotorcraft 100'. Object 200*d* may be difficult to detect and may present a heightened risk of rotor strike. For example, object 200*d* may present an increased risk of collision with one or more of rotors blades 104 of rotorcraft 100. As illustrated in FIG. 2C, rotor blades 104*a* of rotorcraft 100 are separated from at least one portion rotor blades 104*a* of another rotorcraft 100' by a distance D4. At some point, distance D4 may become so small as to be unsafe according to parameters defined by a collision avoidance system (or other suitable system) of rotorcraft 100**.

Returning to FIG. 1, an AI model can incorporate machine learning techniques, such as deep learning techniques, to analyze image information, which may allow the object detection and proximity information to improve over time. In general, machine learning can include the study of computer algorithms that improve automatically through experience and by the use of data. Machine learning algorithms can build a model based on sample data, known as “training data,” to make predictions or decisions without being explicitly programmed to do so.

In certain embodiments, the one or more AI models that aircraft computer system 114 and/or computer system 134 use to process the image information may be trained to detect image objects that correspond to physical objects in the surrounding environment of rotorcraft 100 that may otherwise be difficult or impossible to detect. Additionally or alternatively, the one or more AI models that aircraft computer system 114 and/or computer system 134 use to process the image information may be trained to generate proximity information from the image information for objects that correspond to physical objects in the surrounding environment of rotorcraft 100 that may otherwise be difficult or impossible to detect.

Continuing with the rotorcraft example, in certain embodiments, the AI model, which may be a deep learning model for example, may be trained using images collected from sensors during test flights, whether actual or simulated.

This disclosure contemplates detecting any suitable type of image object that corresponds to any suitable type of physical object, whether or not considered a low-visibility object. Additionally, although this disclosure primarily describes an example of facilitating avoiding a collision of a rotor blade 104 of rotorcraft 100 with one or more physical objects in the surrounding environment of rotorcraft 100, this disclosure contemplates facilitating avoiding a collision of any suitable component (e.g., main rotor system 102, fuselage 106, tail section 108, landing gear 110, tail rotor 118, cockpit 125, etc.) of rotorcraft 100 with one or more physical objects in the surrounding environment of rotorcraft 100.

A first subset of one or more image sensors 132 may provide image information that may assist in detecting (which may include classifying) one or more image objects that correspond to physical objects in a surrounding environment of rotorcraft 100. A second subset of one or more image sensors 132 may provide image information that may assist in generating proximity information for the image information, the proximity information including depth measurements for one or more image objects from the image information that correspond to one or more physical objects in the surrounding environment of rotorcraft 100. The first and second subsets of the one or more image sensors 132 may be the same one or more image sensors 132, a partially overlapping group of one or more image sensors 132, or entirely distinct subsets of one or more image sensors 132. In other words, the one or more image sensors 132 that are used for object detection/classification may be the same, partially the same, or entirely different than the one or more image sensors 132 that are used for proximity detection.

In response to detecting one or more image objects from the image information, aircraft computer system 114 and/or computer system 134 may initiate further analysis of the object information for the one or more image objects to facilitate avoiding, based on the object information, a collision of a rotor blade 104 of rotorcraft 100 with the one or more physical objects that correspond to the one or more image objects. For example, aircraft computer system 114 and/or computer system 134 may provide the object information to collision avoidance logic to facilitate avoiding, based on the object information, a collision of a rotor blade 104 of rotorcraft 100 with one or more physical objects that correspond to the one or more image objects.

In response to generating the proximity information from the image information, aircraft computer system 114 and/or computer system 134 may initiate further analysis of the proximity information to facilitate avoiding, based on the proximity information, a collision of a rotor blade 104 of rotorcraft 100 with one or more physical objects. For example, aircraft computer system 114 and/or computer system 134 may provide the proximity information to collision avoidance logic to facilitate avoiding, based on the object information, a collision of a rotor blade 104 of rotorcraft 100 with one or more physical objects.

Figure 3:
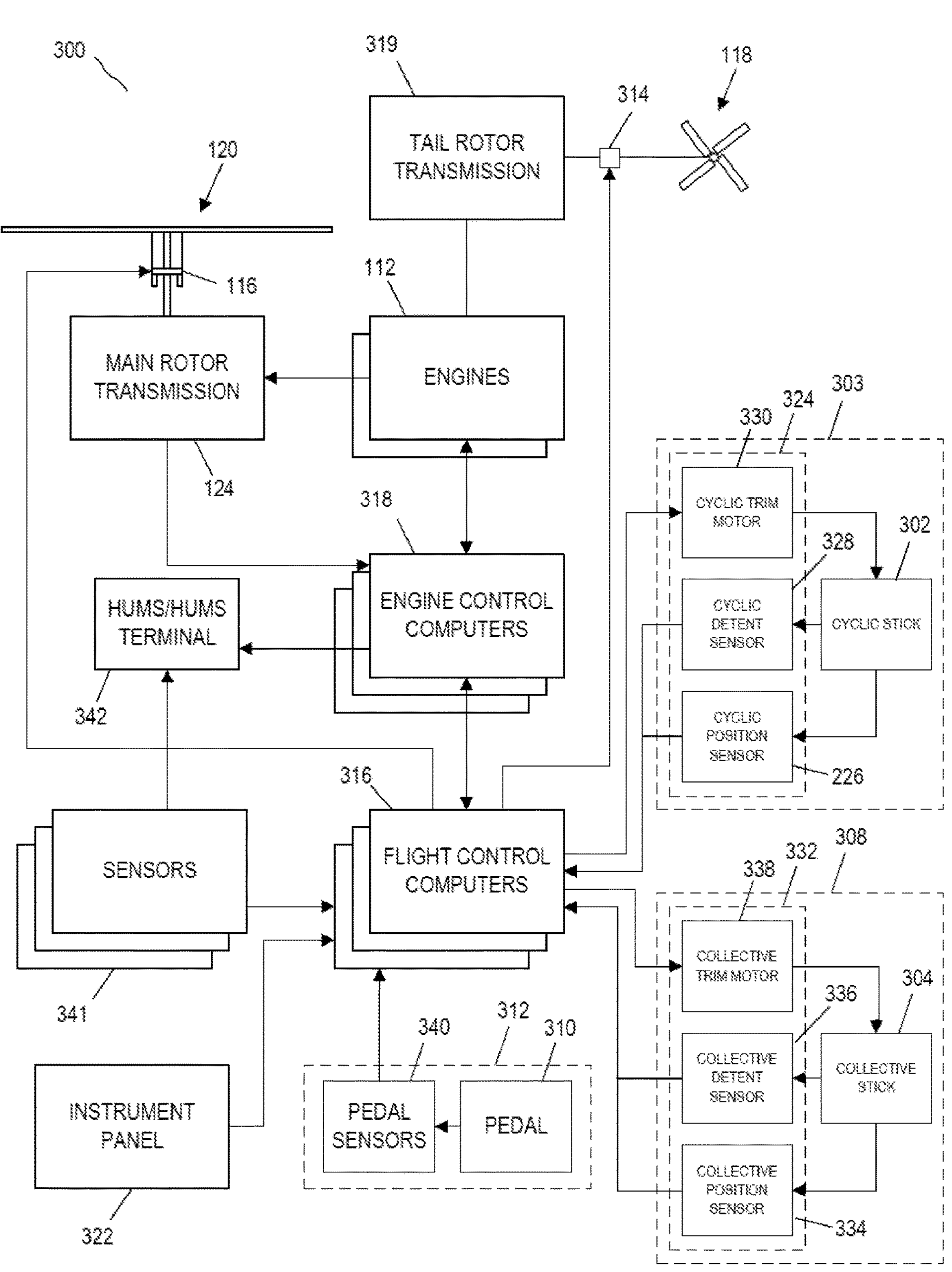
FIG. 3 illustrates a representation of a flight control system for a rotorcraft, according to certain embodiments.

FIG. 3 illustrates a representation of a flight control system 300 for a rotorcraft (e.g., rotorcraft 100), according to certain embodiments. Flight control system 300 may implement some or all of a fly-by-wire (FBW) system.

A pilot may manipulate one or more pilot flight controls to control flight of rotorcraft 100. The pilot flight controls may include manual controls such as a cyclic stick 302 in a cyclic control assembly 303, a collective stick 304 in a collective control assembly 308, and pedals 310 in a pedal control assembly 312. Inputs provided by the pilot to the pilot flight controls may be transmitted mechanically and/or electronically (e.g., via flight control system 300) to flight control devices by the flight control system 300. Flight control devices may represent devices operable to change flight characteristics of rotorcraft 100. Flight control devices on rotorcraft 100 may include mechanical and/or electrical systems operable to change the positions or angle of attack of rotor blades 104 or to change the power output of the engines 112, as examples. Flight control devices include systems such as the swashplate 116, tail rotor actuator 314, and systems operable to control the engines 112. Flight control system 300 may adjust the flight control devices independently of the flight crew in order to stabilize rotorcraft 100, reduce workload of the flight crew, and the like.

Flight control system 300 may include flight control computers (FCCs) 316, engine control computers (which also may be referred to as engine control computer units, or engine control computers) 318, and sensors 341, which collectively adjust the flight control devices and monitor rotorcraft 100 during operation.

Flight control system 300 includes one or more flight control computers 316. In certain embodiments, multiple flight control computers 316 are provided for redundancy. One or more modules within flight control computers 316 may be partially or wholly embodied in any suitable combination of hardware, firmware, and software for performing any operations described herein. In embodiments where flight control system 300 is an FBW flight control system, flight control computers 316 may analyze pilot inputs and dispatch corresponding commands to engine control computers 318, tail rotor actuator 314, and/or actuators for the swashplate 116. Further, flight control computers 316 may be configured by and receive input commands from the pilot controls through sensors associated with each of the pilot flight controls. The input commands may be received by measuring the positions of the pilot controls. Flight control computers 316 also may control tactile cues to the pilot controls or display information in instruments on, for example, an instrument panel 322.

Flight control system 300 includes one or more engine control computers 318, which also may be referred to as engine control computing units, or ECCUs. In certain embodiments, a respective engine control computer 318 is provided for each engine 112. One or more modules within engine control computers 318 may be partially or wholly embodied in any suitable combination of hardware, firmware, and software for performing any operations described herein. Engine control computers 318 control engines 112. For example, engine control computers 318 may vary the output power of engines 112 to control the rotational speed of main rotor blades 104*a* through main rotor transmission 124 and tail rotor blades 104*b* through tail rotor transmission 319. Engine control computers 318 may control the output power of engines 112 according to commands from flight control computers 316, feedback such as measured RPM of main rotor blades 104*a*, or other suitable input.

Cyclic control assembly 303 is connected to a cyclic trim assembly 324 having one or more cyclic position sensors 326, one or more cyclic detent sensors 328, and one or more cyclic actuators or cyclic trim motors 330. Cyclic position sensors 326 measure the position of cyclic stick 302. In certain embodiments, cyclic stick 302 is a single control stick that moves along two axes and permits a pilot to control pitch, which is the vertical angle of the nose of rotorcraft 100 and roll, which is the side-to-side angle of rotorcraft 100. In certain embodiments, cyclic control assembly 303 has separate cyclic position sensors 326 that measure roll and pitch separately. Cyclic position sensors 326 for detecting roll and pitch generate roll and pitch signals, respectively, (sometimes referred to as cyclic longitude and cyclic latitude signals, respectively) which are sent to flight control computers 316, which controls the swashplate 116, engines 112, tail rotor 118, or related flight control devices.

Cyclic trim motors 330 are connected to flight control computers 316, and receive signals from flight control computers 316 to move cyclic stick 302. In certain embodiments, flight control computers 316 determine a suggested cyclic stick position for cyclic stick 302 according to one or more of the collective stick position; the pedal position; the speed, altitude, and attitude of rotorcraft 100; the engine RPM, engine temperature, main rotor RPM, engine torque, or other rotorcraft system or flight conditions; or according to a predetermined function selected by the pilot. The suggested cyclic stick position is a position determined by flight control computers 316 to give a desired cyclic action. In certain embodiments, flight control computers 316 send a suggested cyclic stick position signal indicating the suggested cyclic stick position to cyclic trim motors 330. While flight control computers 316 may command cyclic trim motors 330 to move cyclic stick 302 to a particular position (which would in turn drive actuators associated with swashplate 116 accordingly), cyclic position sensors 326 detect the actual position of cyclic stick 302 that is set by cyclic trim motors 330 or input by the pilot, allowing the pilot to override the suggested cyclic stick position. Cyclic trim motor 330 is connected to cyclic stick 302 so that the pilot may move cyclic stick 302 while the trim motor is driving cyclic stick 302 to override the suggested cyclic stick position. Thus, in certain embodiments, flight control computers 316 receive a signal from cyclic position sensors 326 indicating the actual cyclic stick position, and do not rely on the suggested cyclic stick position to command swashplate 116.

Similar to cyclic control assembly 303, collective control assembly 308 is connected to a collective trim assembly 332 having one or more collective position sensors 334, one or more collective detent sensors 336, and one or more collective actuators or collective trim motors 338. Collective position sensors 334 measure the position of collective stick 304 in collective control assembly 308. In certain embodiments, collective stick 304 is a single control stick that moves along a single axis or with a lever type action. A collective position sensor 334 detects the position of collective stick 304 and sends a collective position signal to flight control computers 316, which controls engines 112, swashplate actuators, or related flight control devices according to the collective position signal to control the vertical movement of rotorcraft 100. In certain embodiments, flight control computers 316 may send a power command signal to engine control computers 318 and a collective command signal to the main rotor or swashplate actuators so that the angle of attack of the main blades is raised or lowered collectively, and the engine power is set to provide the needed power to keep the main rotor RPM substantially constant.

Collective trim motor 338 is connected to flight control computers 316, and receives signals from flight control computers 316 to move collective stick 304. Similar to the determination of the suggested cyclic stick position, in certain embodiments, flight control computers 316 determine a suggested collective stick position for collective stick 304 according to one or more of the cyclic stick position; the pedal position; the speed, altitude, and attitude of rotorcraft 100; the engine RPM, engine temperature, main rotor RPM, engine torque, or other rotorcraft system conditions or flight conditions; or according to a predetermined function selected by the pilot. Flight control computers 316 generate the suggested collective stick position and send a corresponding suggested collective stick signal to collective trim motors 338 to move collective stick 304 to a particular position. Collective position sensors 334 detect the actual position of collective stick 304 that is set by collective trim motor 338 or input by the pilot, allowing the pilot to override the suggested collective stick position.

Pedal control assembly 312 has one or more pedal sensors 340 that measure the position of pedals 310 or other input elements in the pedal control assembly 312. In certain embodiments, pedal control assembly 312 is free of a trim motor or actuator, and may have a mechanical return element that centers pedals 310 when the pilot releases pedals 310. In other embodiments, pedal control assembly 312 has one or more trim motors that drive a pedal 310 to a suggested pedal position according to a signal from flight control computers 316. Pedal sensors 340 detect the position of pedals 310 and sends a pedal position signal to flight control computers 316, which controls the tail rotor 118 to cause rotorcraft 100 to yaw or rotate around a vertical axis.

Cyclic and collective trim motors 330 and 338 may drive cyclic stick 302 and collective stick 304, respectively, to suggested positions. Cyclic and collective trim motors 330 and 338 may drive cyclic stick 302 and collective stick 304, respectively, to suggested positions, but this movement capability may also be used to provide tactile cueing to a pilot. Additionally, cyclic control assembly 303, collective control assembly 308, and/or pedal control assembly 312 each may have one or more detent sensors that determine whether the pilot is handling a particular control device. Flight control computers 316 may provide different default control or automated commands to one or more flight systems based on the detent status of a particular stick (cyclic stick 302 or collective stick 304) or pilot control.

In certain embodiments, sensors 341 are in communication with flight control computers 316, HUMS 342, and/or any other suitable components of rotorcraft 100 or computer system 134. Sensors 341 may include sensors for monitoring operation of the rotorcraft, providing pilot data, providing operational data, or the like, and sensors 341 may include sensors for measuring a variety of rotorcraft systems, flight parameters, environmental conditions, and the like. For example, sensors 341 may include sensors for gathering flight data, and may include sensors for measuring airspeed, altitude, attitude, position, orientation, temperature, airspeed, vertical speed, and the like. Sensors 341 may include sensors relying upon data or signals originating external to rotorcraft 100, such as a global positioning system (GPS) sensor, a VHF Omnidirectional Range sensor, Instrument Landing System (ILS), and the like. Sensors 341 may include sensors for reading operational data such as vibration, device rotational speed, electrical operating characteristics, fluid flows, or the like. Sensors 341 may include any of the sensors described throughout this disclosure and/or any other suitable sensors in any suitable combination. In certain embodiments, sensors 341 may include image sensors 142 of FIG. 1 such that image sensors 142 provide image information to one or more of flight control computers 316 or HUMS 342.

Continuing with FIG. 3, flight control system 300 may include HUMS 342 or a HUMS terminal. In certain embodiments, HUMS 342 collects data from flight control system 300 elements for storage and later download, analysis, or the like. In certain embodiments, HUMS 342 may be connected to or otherwise capable of communicating with one or more sensors 341, flight control computers 316, engine control computers 318, standalone sensors, sensors integrated into HUMS 342, or other system components, or a combination of components. In certain embodiments, HUMS 342 may be separate from flight control computers 316, and may be implemented as a standalone system that communicates with, but that is operationally separate from, other elements of flight control system 300. HUMS 342 may be a terminal that stores raw data from one or more aircraft components, and provides the raw data to a server for interpretation and analysis. Additionally or alternatively, HUMS 342 may interpret raw data to determine one or more condition indicators for a server or other system that analyzes or displays the data. Additionally or alternatively, HUMS 342 may analyze the raw data or condition indicators to determine a predicted load on a component of rotorcraft 100, determine an estimated fatigue life of a component of rotorcraft 100 that is individualized for the component, generate a maintenance plan for rotorcraft 100 (including an individualized maintenance recommendation for the component), and may display or indicate the interpreted data, a warning, a system status, or like, on instrument panel 322, on a dedicated display, through an audible warning, within another display such as a flight director display, though a tactile feedback system, or the like.

HUMS 342 may use data from sensors 341 to determine an operating condition such as vibration. For example, HUMS 342 may use a combination of vibration data and rotational speed data to generate synchronous vibration data or other transformed data types, which may be analyzed to determine a predicted load on a component of rotorcraft 100, determine an estimated fatigue life of a component of rotorcraft 100 that is individualized for the component, generate a maintenance plan for rotorcraft 100 (including an individualized maintenance recommendation for the component) for specific components associated with the vibration data.

In certain embodiments, flight control computers 316, engine control computers 318, and HUMS 342 may be some or all of the processing devices of aircraft computer systems 114.

Figure 4:
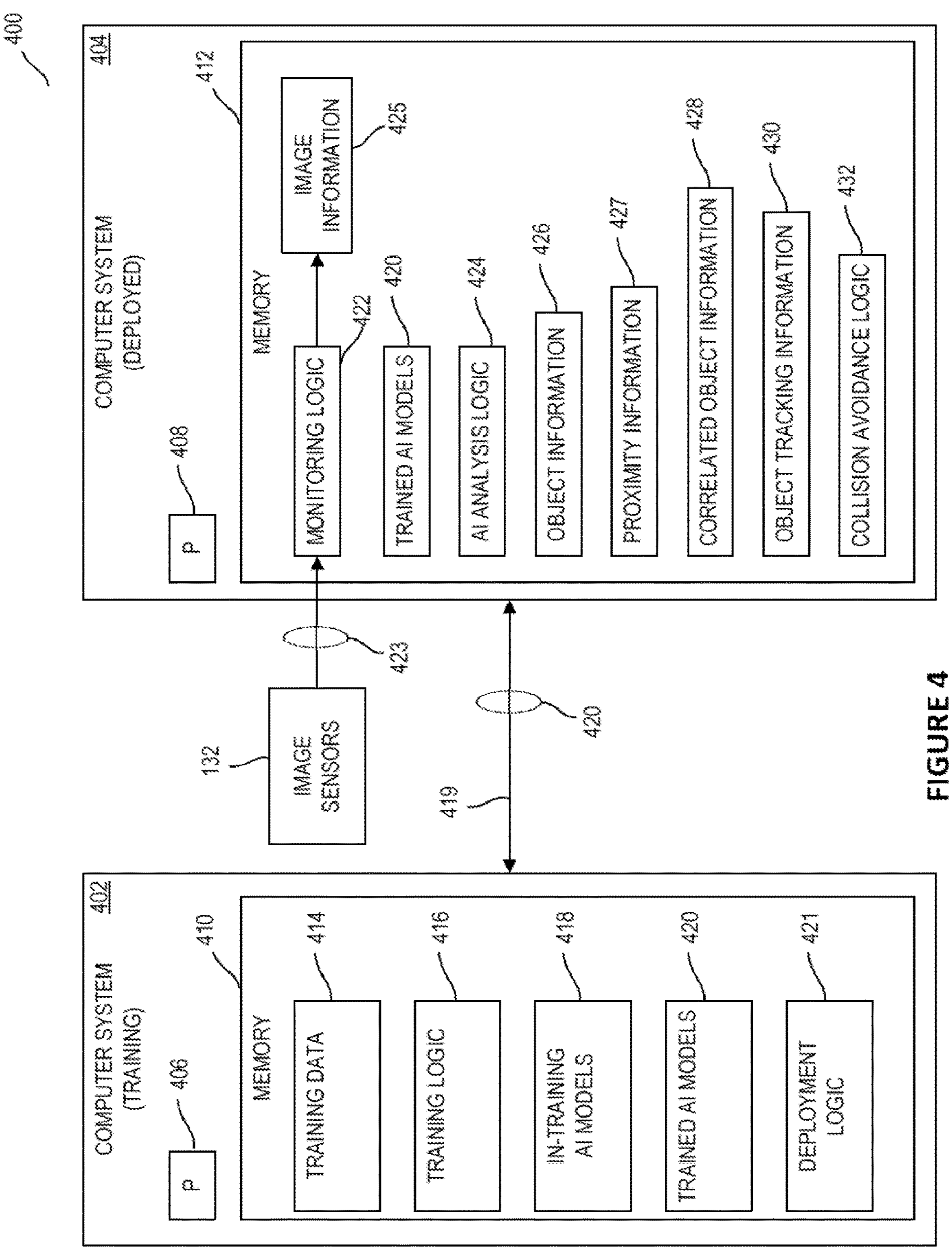
FIG. 4 illustrates an example system for detecting objects and distance to objects, according to certain embodiments.

FIG. 4 illustrates an example system 400 for detecting objects and distance to objects for avoiding rotor strike collision, according to certain embodiments. In the illustrated example, system 400 includes a computer system 402, a computer system 404, and image sensors 132. For purposes of this example, computer system 402 is described as a training computer system that, during a training phase, trains one or more AI models for detecting objects and distance to objects for avoiding rotor strike collision, and computer system 404 is described as a deployed computer system in which the one or more trained AI models are deployed for processing actual data from image sensors 132 for detecting objects and distance to objects for avoiding rotor strike collision on an aircraft deployed for actual use and associated operations. For purposes of the remainder of this example, it will be assumed that the aircraft is rotorcraft 100.

In certain embodiments, computer system 402, which performs the AI model training in this example, may correspond to computer system 134 of FIG. 1 or to another computer system external to rotorcraft 100; however, computer system 402 may be at any suitable location, including on rotorcraft 100. In certain embodiments, computer system 404, which performs processing of actual live data (e.g., image information from image sensors 132) using the one or more trained AI models, may correspond to a computer system 114 on rotorcraft 100 (as shown in FIG. 1) or to another computer system on rotorcraft 100. For example, computer system 404 could be (or be a part of) HUMS 342, flight control computers 316, or another computer system on rotorcraft 100. This disclosure, however, contemplates computer system 404 being at any suitable location, including partially or wholly on board rotorcraft 100 or off board rotorcraft 100.

Furthermore, although computer systems 402 and 404 are illustrated and described separately for purposes of this example, computer systems 402 and 404 could be the same computer systems. In other words, in certain embodiments, the same computer system could perform both the training of the one or more AI models and the processing of actual live data using the one or more trained AI models, if appropriate. Furthermore, this disclosure contemplates subdividing the operations among computer systems differently than shown and described. As just one example, a computer system on board rotorcraft 100 may collect the data from image sensors 132 and then communicate that data (in raw format or with any suitable pre-processing) to another computer system (on board or off board rotorcraft 100) for analysis using the one or more trained AI models and additional operations.

Computer system 402 and computer system 404 include processor 406 and processors 408, respectively. Processors 406 and 408 may be any component or collection of components adapted to perform computations and/or other processing-related tasks. Processors 406 and 408 can be, for example, a microprocessor, a microcontroller, a control circuit, a digital signal processor, a field-programmable gate array (FPGA), an application-specific integrated circuit (ASIC), a system-on-chip (SoC), a graphics processing unit (GPU), or combinations thereof. Furthermore, each of processor 406 and 408 may include any suitable number of processors, or multiple processors may collectively form a single processor 406 or 408.

Computer system 402 and computer system 404 may include memory 410 and memory 412, respectively. Memories 410 and 412 may include any suitable combination of volatile memory, nonvolatile memory, and/or virtualizations thereof. Memories 410 and 412 may include data structures used to organize and store all or a portion of the stored data. In general, memories 410 and 412 can store any data used by or accessible to computer systems 402 and 404, respectively. In the illustrated example, memory 410 stores training data 414, training logic 416, in-training AI models 418, trained AI models 420, and deployment logic 421. Additionally, in the illustrated example, memory 412 stores monitoring logic 422, trained AI models 420, AI analysis logic 424, object information 426, proximity information 427, correlated object information 428, object tracking information 430, and collision avoidance logic 432.

Turning to computer system 402, training data 414 may include data to be used for training in-training AI models 418 to generate trained AI models 420. Training data 414 may include image information for test images that include image objects of physical objects that rotorcraft 100 may encounter during operation or that otherwise may be useful for training in-training AI models 418 to result in useful trained AI models 420 for detecting objects and/or distance to objects during operation of rotorcraft 100. In certain embodiments, training data 414 includes image information for test images that include low-visibility image objects that represent low-visibility physical objects that rotorcraft 100 may encounter during operation. Training data 414 may include test image information collected from test flights, which may be actual test flights of a physical rotorcraft or simulated test flights. For example, training data 414 may include data gathered from historical rotorcraft operation test data.

Training logic 416 may include the logic for executing a training phase to train in-training AI models 418 using training data 414 to generate trained AI models 420. In operation of an example embodiment, training logic 416 may access training data 414 and train in-training AI models 418 using the training data.

Additional example details for training an AI model are described below in connection to FIGS. 7 and 8.

Continuing with FIG. 4, this disclosure contemplates any suitable pre-processing being performed on training data prior to using the training data to train in-training AI models 418. For example, such preprocessing may include any suitable combination of signal preparation (e.g., filtering and noise removal, and level normalization), feature engineering (spectrum analysis, cepstral analysis, peak detection, and zero-crossing detection), or any other suitable pre-processing.

Trained AI models 420 are versions of AI models following training by training logic 416 using training data 414. Trained AI models 420 are ready for deployment for use during actual operation of rotorcraft 100. For example, trained AI models 420 may have been trained to detect, using the type of learning (e.g., deep learning) implemented by trained AI models 420, image objects in image information that correspond to actual physical objects that may be in a surrounding environment of rotorcraft 100 during operation, and at least some of those image objects/physical objects may be low-visibility objects. As another example, trained AI models 420 may have been trained to generate, using the type of learning (e.g., deep learning) implemented by trained AI models 420, proximity information (e.g., a depth map) from image information that corresponds to an actual physical environment (e.g., including physical objects) that may be encountered by rotorcraft 100 during operation.

It should be understood that system 300 could train multiple in-training models 418 to generate multiple trained AI models 420.

Deployment logic 421 may deploy trained AI models 420 for use in evaluating actual image information associated with actual operation of rotorcraft 100. For example, deployment logic 421 may transmit a copy of trained AI models 420 to computer system 404 via links 419. Links 419 may include any suitable combination of wired or wireless communication links, such as any suitable combination of an Ethernet connection, a Wi-Fi connection, a cellular connection, a satellite link, an ACARS link, or the like.

Trained AI models 420 may be retrained, if appropriate. For example, it may be desirable to retrain AI models 420 periodically, which may help maintain and/or improve the performance of AI models 420 at providing relatively accurate object detection and/or proximity information. Trained AI models 420 may be retrained using entirely new training data, modifications to existing training data 414, modifications to aspects of AI models 420 (e.g., to one or more layers of AI models 420), or any other suitable information.

Turning to computer system 404, monitoring logic 422 may monitor image sensors 132 for output signals 423. In certain embodiments, image sensors 132 are configured to report output signals 423 to monitoring logic 422 automatically. Additionally or alternatively, monitoring logic 422 may poll image sensors 132 for output signals 423.

Output signals 423 from image sensors 132 may include image information associated with images captured by one or more image sensors 132 of at least a portion of the environment surrounding rotorcraft 100 (e.g., within the fields of view of the one or more image sensors 132), such as during actual operation of rotorcraft 100. A sensor 132 itself and/or monitoring logic 422 may perform certain pre-processing on the data signal to generate the image information. In certain embodiments, data signals (output signals 423) from image sensors 132 may include substantially real-time images taken by image sensors 132 during operation of rotorcraft 100.

The one or more image sensors 132 may each have respective fields of view. The image information generated by a particular image sensor 132 may correspond to a region of the surrounding environment of rotorcraft 100 within the field of view of that image sensor 132. To the extent output signals 423 include data signals (e.g., image information) from multiple image sensors 132, those image sensors 132 may have the same or different respective fields of view (e.g., in terms of size), and those respective fields of view may cover the same or different regions of the surrounding environment of rotorcraft 100. In certain embodiments, at least two image sensors 132 may be oriented such that the respective fields of view of the at least two image sensors 132 cover at least partially different regions of the environment surrounding rotorcraft 100.

Monitoring logic 422 may store output signals 423 as image information 425. Image information 425 may be included in or otherwise derived from output signals 423, and may be considered as generated by image sensors 132. Image information 425 may be associated with images captured by one or more image sensors 132 of at least a portion of the surroundings of rotorcraft 100, such as during actual operation of rotorcraft 100. For example, output signals 423 may include image information that includes information for one or more images of at least a portion of an environment (e.g., within the fields of view of the one or more image sensors 132) surrounding rotorcraft 100.

As particular examples, image information 425 may include one or more images from one or more sensors 132 outwardly oriented from a front of rotorcraft 100, one or more images from one or more sensors 132 outwardly oriented from a rear of rotorcraft 100, one or more images from one or more sensors 132 outwardly oriented from one or both sides of rotorcraft 100, one or more images from one or more sensors 132 outwardly oriented from the bottom of rotorcraft 100, one or more images from one or more sensors 132 outwardly oriented from a top of rotorcraft 100, or a combination of these or other images.

Image information 425 may be the raw sensor data of output signal 423 of image sensors 132 or data derived from the raw sensor data. For example, in the case of data derived from the raw sensor data, image sensors 132 and/or monitoring logic 422 may process the raw sensor data to determine image information 425. This disclosure contemplates any suitable pre-processing being performed on the actual data signal prior to submitting the actual data signal to trained AI models 420. For example, such preprocessing may include any suitable combination of signal preparation (e.g., filtering and noise removal, and level normalization), feature engineering (spectrum analysis, cepstral analysis, peak detection, and zero-crossing detection), or any other suitable pre-processing.

Monitoring logic 422 may store image information 425 in any suitable manner. In certain embodiments, the stored image information 425 may be indexed by a sensor identifier identifying the image sensor 132 from which the image information 425 was received/derived, an identification of the one or more views from rotorcraft 100 to which image information 425 applies (e.g., outward front, outward rear, outward top, outward bottom, outward left, outward right, etc.), timestamp information, or any other suitable information for indexing image information 425.

AI analysis logic 424 may cause trained AI models 420 to analyze image information 425 generated by image sensors 132 to generate object information 426 and/or proximity information 427. For example, an input to trained AI models 420 may include one or more signals including image information 425 from one or more image sensors 132 capture images with their respective fields of view during actual operation of rotorcraft 100.

AI models 420 may process the image information 425 and generate an output signal that includes object information 426 and/or proximity information 427. It should be understood that any suitable numbers and types of trained AI models may be used.

In certain embodiments, at least one trained AI model 420 is capable of processing image information 425 and generating object information 426. For example, at least one trained AI model 420 may be capable of detecting image objects in image information 425, and those image objects may correspond to physical objects (e.g., objects 200) that may be present in environment around rotorcraft 100 during operation of rotorcraft 100. In certain embodiments, the object information 426 may include location information for detected image objects, object-type classification for detected image objects, and/or any other suitable information.

In certain embodiments, at least one trained AI model 420 is capable of generating proximity information from image information 425 to provide depth information about at least a portion of environment around rotorcraft 100 during operation of rotorcraft 100. For example, at least one AI trained AI model 420 may use a depth estimation neural network, such as monocular depth estimation, to process image information and determine a depth map for the image information. This depth information may be used to track the proximity of objects in the environment of rotorcraft 100.

The same or different AI models 420 may be capable of generating object information 426 and proximity information 427. Additionally, the one or more AI models 420 that generate object information 426 and the one or more AI models 420 that generate proximity information 427 may use the same or different portions of image information 425 to generate object information 426 and proximity information 427, respectively.

Correlated object information 428 may be generated by considering both object information 426 and proximity information 427 together. For example, for the detected image objects of object information 426, distances from rotorcraft 100 of the physical objects 200 that correspond to those image objects from rotorcraft 100 may be determined using proximity information 427. This may allow collision avoidance logic 432 (and potentially the pilot of rotorcraft 100) to not only know the location of detected physical objects 200 around a perimeter of rotorcraft 100, but also a distance of those physical objects 200 from rotorcraft 100. This combined information may allow collision avoidance logic 432 and/or the pilot of rotorcraft 100 to make more precise decisions to operate rotorcraft 100 in a manner that avoids a rotor strike collision with the physical objects 200 that correspond to detected image objects.

Correlated object information 428 may be generated, managed, and used by any suitable combination of monitoring logic 422, trained AI models 420, AI analysis logic 424, collision avoidance logic 432, or any other suitable computer system or component of computer system 404.

Object tracking information 430 may provide an ability to track locations of identified objects 200 over time, as those objects 200 move throughout the environment surrounding rotorcraft 100, due to movement of objects 200, movement of rotorcraft 100, or possibly both. Object tracking information 430 may include entries for objects that have been identified and locations of those objects that are updated as those objects continue to be detected within image information 425. If applicable, object tracking information 430 may be supplemented with depth information (e.g., as determined from proximity information 427 and/or correlated object information 428), so that a distance of the physical objects 200 that correspond to the detected image objects from rotorcraft 100 can be tracked.

Object tracking information 430 may be generated, managed, and used by any suitable combination of monitoring logic 422, trained AI models 420, AI analysis logic 424, collision avoidance logic 432, or any other suitable computer system or component of computer system 404.

Collision avoidance logic 432 may analyze object information 426, proximity information 427, correlated object information 428, and/or object tracking information 430 to facilitate avoiding a collision of a rotor blade 104 of rotorcraft with one or more physical objects 200 in an environment in which rotorcraft 100 is operating. For example, collision avoidance logic 432 may analyze object information 426 and proximity information 427 to determine whether physical objects 200 in a surrounding environment of rotorcraft 100, as determined from image objects identified from object information 426 and/or proximity information 427, pose a potential collision threat to rotorcraft 100. For example, collision avoidance logic 432 may analyze object information 426 and proximity information 427 to determine whether physical objects 200 in a surrounding environment of rotorcraft 100 pose a potential threat for rotor strike collision with a rotor blade 104 of rotorcraft 100.

If collision avoidance logic 432 determines that a collision threat is posed, then collision avoidance logic 432 may initiate execution of a remedial action. For example, collision avoidance logic 432 may initiate an annunciation to alert a pilot of rotorcraft 100 of the potential threat. The annunciation could include audible feedback (e.g., an audible announcement and/or alarm), visible feedback (e.g., one or more lights, a visible display, and/or other visible alerts), tactile feedback (e.g., a vibration of a seat or handheld control (e.g., cyclic stick 302 and/or collective stick 304), and/or any other suitable type of annunciation. As another example, collision avoidance logic 432 may send an instruction to cause a suitable system of rotorcraft 100 to initiate a corrective flight action to avoid the collision, if possible. Computer system 404 (e.g., collision avoidance logic 432) may initiate any of these or other possible remedial actions, alone or in combination.

Although functionality and data are shown grouped in a particular manner in FIG. 4, the functionality and/or data may be separated or combined differently, as may be appropriate for a particular implementation. As just one example, in certain embodiments, computer system 404 may communicate object information 426 and/or proximity information 427 to another computer system, which may determine and perform operations associated with correlated object information 428, object tracking information 430, and collision avoidance logic 432. Computer system 402 and computer system 404 may be implemented using any suitable combination of hardware, firmware, and software. In certain embodiments, computer systems 402 and 404 may individually or collectively be implemented using a computer system such as the example described below with reference to FIG. 14.

Figure 5:
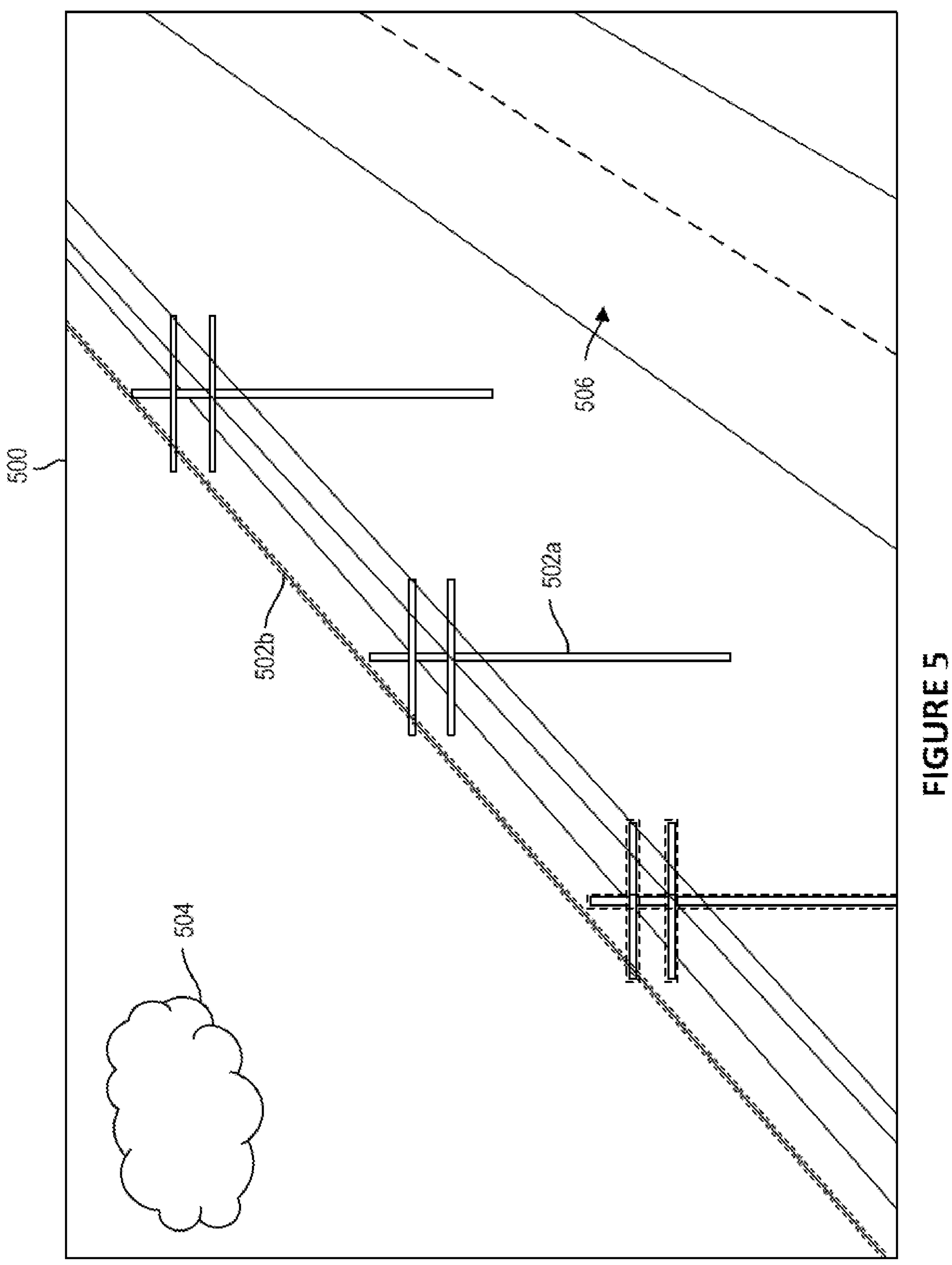
FIG. 5 illustrates an example image that is a visualization of image information with one or more detected image objects, according to certain embodiments.

FIG. 5 illustrates an example image 500 that is a visualization of image information 425 with one or more detected image objects, according to certain embodiments.

At the state shown in FIG. 5, image information 425 from which image 500 is generated has been processed by one or more AI models (e.g., trained AI models 420) to detect one or more image objects from image information 425, resulting in the illustrated example in detected image objects 502. In this example, image objects 502 include objects 502*a* (power line poles) and image objects 502*b* (power lines). In certain embodiments, image objects 502*a* and 502*b* may correspond to physical objects in a surrounding environment of rotorcraft 100. As just one example, image objects 502*a* (power line poles) and image objects 502*b* (power lines) may correspond to objects 200*a* (power line poles) and objects 200*b* (power lines). Also included in image 500 are a cloud 504 and a road 506, which have not been shown to be identified by the one or more AI models (e.g., trained AI models 420) in this example.

Image 500 might or might not be displayed by a display of rotorcraft 100. In the illustrated visualization of image 500 generated from image information 425, image objects 502 are surrounded by bounding boxes (e.g., represented as dashed lines), which may represent to a viewer of image 500 that those image objects 502 are detected image objects 502. While shown as dashed lines, detected image objects 502 could be highlighted in any suitable manner. To avoid overcrowding the figure, only one power line pole (image object 502*a*) and one power line (image object 502*b*) are shown as highlight. In certain embodiments, each detected image object 502 may be indicated in some (and potentially the same) manner.

In certain embodiments, the one or more AI models (e.g., trained AI models 420) also may be able to provide location information for image objects 502 and to determine an object-type classification for image objects 502.

For example, the one or more AI models (e.g., trained AI models 420) may determine and provide the location information as pixel coordinates in image 500, which aircraft computer system 114 and/or computer system 134 may be able to correlate to a physical location in a surrounding environment of rotorcraft 100. As a particular example, the one or more AI models (e.g., trained AI models 420) may provide the location information (e.g., pixel coordinates in image 500) of image objects 502 as part of object information 426, which aircraft computer system 114 and/or computer system 134 may be able to correlate to a physical location in a surrounding environment of rotorcraft 100.

As another example, the one or more AI models (e.g., trained AI models 420) may determine an object-type classification for image objects 502. As a particular example, the one or more AI models (e.g., trained AI models 420) be able to determine the type of physical object that corresponds to the image object(s) 502 detected in image 500, such as power line poles for image objects 502*a* and power lines for image objects 502*b*. This object-type classification information may be provided as part of object information to aircraft computer system 114 and/or computer system 134. This ability may be a result of training to not only detect that something (an image object) is present in image information 425, but to identify what that something (image object) is in the form of an object-type classification.

Figure 6A:
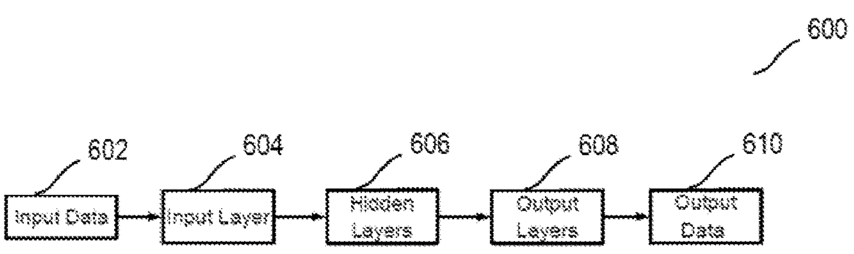
FIGS. 6A-6B are symbolic diagrams illustrating architectures and training systems for AI models, according to certain embodiments.
Figure 6B:
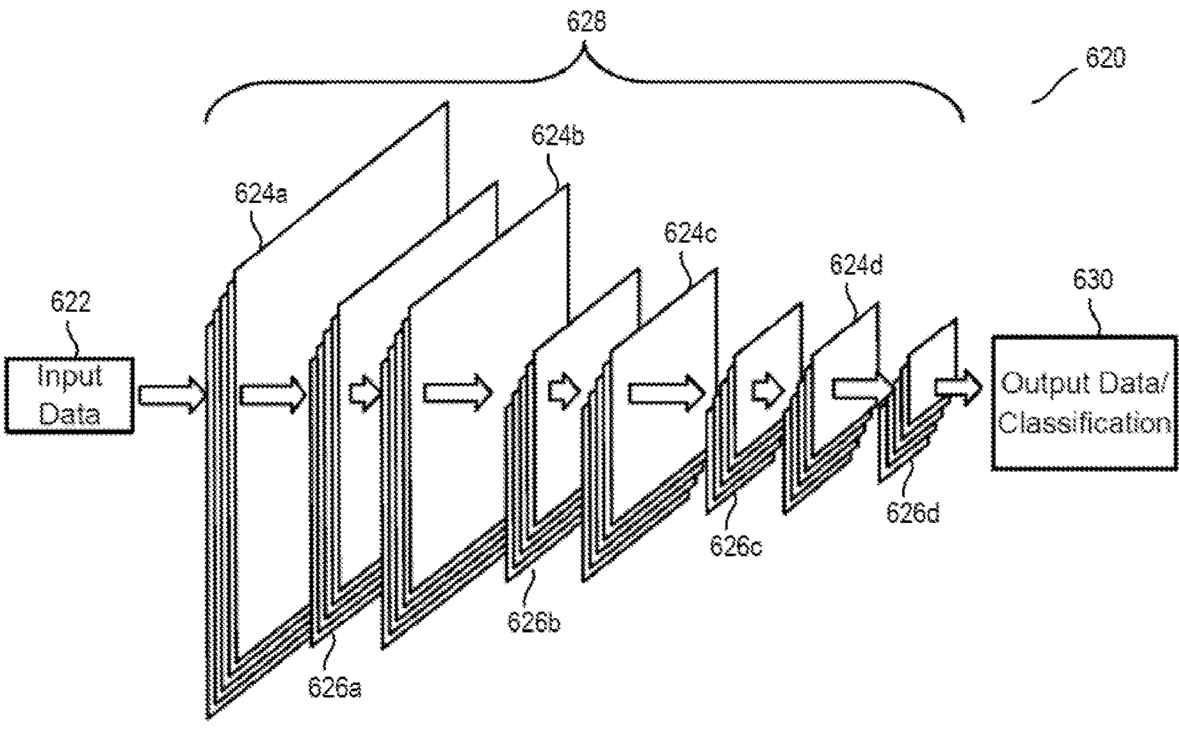

FIGS. 6A-6B are symbolic diagrams illustrating architectures and training systems for AI models, according to certain embodiments. AI models are a set of mathematical functions that can be used to correlate incoming data with known elements, such as images, sounds, motions, and the like. Thus, an AI model may be a set of functions used for image, sound, text or motion recognition. An example AI recognition model may be a convolutional neural network (CNN). In certain embodiments, one or more of in-training AI models 418 and/or trained AI models 420 may be implemented according to the example details of FIGS. 6A-6B.

FIG. 6A is a symbolic diagram illustrating layers of an AI model 600 according to some embodiments. AI model 600 takes in input data 602 through an input layer 604.

In general, a layer of an AI model is a structure or network topology in the model's architecture that receives information from previous layers and then passes the information to a next layer. For example, a layer may be a container that receives weighted input, transforms the weighted input with a set of potentially non-linear functions, and then passes these processed values as output to a next layer. In certain embodiments, a layer may be uniform in that the layer contains one type of activation function (e.g., pooling, convolution, or another type of activation). Layers in a deep learning model may include, for example, one or more dense layers (also called fully-connected layers), one or more two-dimensional convolutional layers, one or more long short-term memory (LSTM) layers, one or more attention layers, and/or any other suitable types of layers in any suitable combination and order. Each layer may include one or more nodes, the number of nodes being the width of that layer. Each node may correspond to an input to that layer.

In general, input data 602 is input into AI model 600, and output data 610 is output by AI model 600. Input data 602 may include training data (e.g., training data 414) when AI model 600 is being trained or actual image information (e.g., image information 425) when AI model 600 is deployed. Input data 602 also could be referred to as input variables, the visible layer, or other suitable terms.

Input layer 604 converts input data 602 into a format usable by hidden layers 606. For example, in an image recognition or computer vision AI model, input data 602 may be, for example, an image with two dimensions. In certain embodiments, input layer 604 may convert the image input data 602 into a numeric representation such as a matrix with the data values reflected in the matrix. In certain embodiments, input layer 604 may convert multidimensional input data 602 into a single dimension array, apply filters, trim, or normalize input data 602, or perform other pre-processing.

Input layer 604 may provide the prepared data to a set of hidden layers 606. In a CNN, hidden layers 606 may provide one or more convolutions or filters. Hidden layers 606 may use filters that are trained by applying weights and biases to a variety of filters to identify desired features from the image data. In certain embodiments, hidden layers 606 may provide probabilities or other data related to extracted or identified features. A CNN may take advantage of hierarchical patterns in input data and assemble patterns of increasing complexity using smaller and simpler patterns in the filters of convolutional layers. Thus, CNNs may use the hierarchical structure of the data they are processing. CNNs may break input data down into smaller, simpler features, which may be represented by the filters of the convolutional layers. These filters may be applied to different regions of the input to extract the relevant information. As the network progresses through the layers, these features may be combined and assembled into more complex patterns, allowing the network to learn increasingly abstract representations of the input.

An output layer 608 may be used to classify data received from the hidden layers 606. Output layer 608 may use the output from hidden layers 606 to determine a probability that a particular image, or portion of an image, belongs to a particular classification and output that information as output data 610.

FIG. 6B is a symbolic diagram illustrating layers of an CNN AI model 620 according to certain embodiments. CNN AI model 620 may have hidden layers 628 that receive input data 622 and that perform mathematical processes on input data 622 so that input data 622 may be classified. Hidden layers 628 may include one or more convolutional layers 624A-624D and one or more pooling layers 626A-626D. In certain embodiments, each convolutional layer 624A-624D include one or more trainable filters or kernels that are applied to the data. Each convolutional layer 624A-624D may convolve the input by a filter and pass the result to a next layer. Convolutional layers 624A-624D may abstract image data to a feature map, or an activation map.

Pooling layers 626A-626D may be used after convolutional layers 624A-624D to reduce the dimensions of a feature map or other data by combining the outputs of neuron clusters at a layer into a single layer of a following layer. Thus, a pooling layer 626A-626D may combine small clusters of to reduce the size of data before providing the reduced feature map to a next convolution layer 624A-624D. In certain embodiments, pooling may be max pooling, where the maximum value in a local cluster may be provided as a neuron value to the next convolutional layer 624A-624D. In certain embodiments, pooling may use average pooling by averaging the values of data in a particular cluster, and passing the average value as a neuron value to a next convolutional layer 624A-624D. The output from hidden layers 628 may then be passed for classification to a classification element 630 such as an output layer, or the like.

AI models 600 and 620 illustrate just two examples of AI models that may be used for detecting objects and distance to objects for rotorcraft rotor strike avoidance. In certain embodiments, AI models 600 and 620 may be considered deep learning models. In certain embodiments, one or more of AI models 420 may be implemented using AI models that are the same or similar to AI models 600 and 620, or otherwise incorporate concepts similar to those of AI models 600 and 620. Although AI models 600 and 620 are illustrated and described as including particular numbers of layers (e.g., as having particular depths), AI models 600 and 620 may include any suitable number of layers, including one or more. Additionally, although AI models 600 and 620 are illustrated and described as including particular layers, AI models 600 and 620 may include any suitable layers in any suitable combination. Additionally, although layers of AI models 600 and 620 are illustrated and described in a particular order, the layers of AI models 600 and 620 may be arranged in any suitable order. In other words, although AI models 600 and 620 are illustrated and described as having a particular architecture, this disclosure contemplates AI models 600 and 620 having any suitable architecture.

Figure 7:
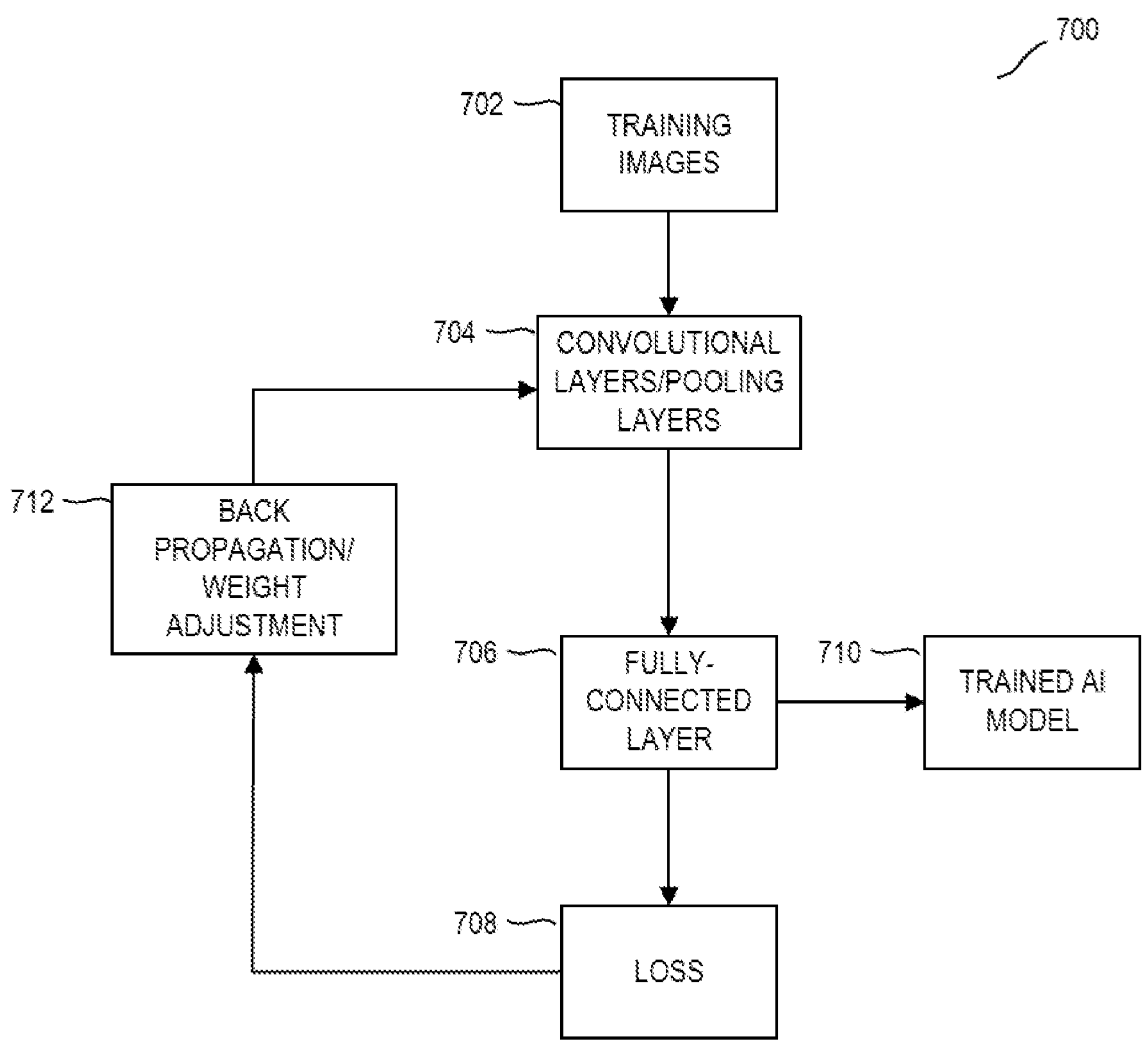
FIG. 7 illustrates an example of a system for training an AI model, according to certain embodiments.

FIG. 7 illustrates an example of a system 700 for training an AI model, according to certain embodiments. An AI model may use a set of weights and biases used to make predictions and the error for those predictions is calculated. For image recognition systems, the predictions may be predictions of whether an image is part of an identified class. For depth estimation systems, the predictions may be predictions about distances to the physical objects represented at various parts of an image. In certain embodiments, one or more of training data 414, training logic 416, and/or in-training AI models 418 (and, ultimately, trained AI model 420) may be implemented according to the example details of FIG. 7.

A training data set having one or more training images 702 is identified. Training images 702 may be an example of training data 414. The training data set provides data that can be used to train an AI model to identify, or avoid, certain types of data, and relate that data to specified categories of classifications. For example, when training an image recognition AI model, training images 702 may be static images, videos, or the like, and may have data that can be positively identified as belonging to a desired classification, and data that may be positively identified as not belonging to a desired classification. The desired classification may be a category of conceptual items that the AI model should identify an analyzed image as belonging to, or not belonging to. For example, where the desired classification is a dog, the training images may be of dogs and other items, and the AI model may be trained to identify dog images from the training data set as belonging to the dog classification, and to identify non-dog images from the training data set as not belonging to the dog classification.

In certain examples for detecting objects and/or proximity, training images 702 may include positive classification data such as video, images, or other data related to physical objects that a rotorcraft 100 may encounter in the surrounding environment of rotorcraft 100 during operation of rotorcraft 100, including, potentially, low-visibility objects. The AI model may be trained to associate the positive classification data with an object type (e.g., a power line a pole, a fence, etc.). In certain embodiments, the training data (e.g., training images 702) may have negative classification data that may include video, images or other data that are not associated with the identified physical object, and in certain embodiments, may also include video or images illustrating incorrect features, such as images that may appear like a particular object in some ways but actually are not. This permits the AI model to be trained on what is a particular type of object and what is not a particular object. Training images 702 for training an AI model to recognize certain image objects 502 that correspond to physical objects 200 may include positive classification data such as images of those physical objects 200 (e.g., a power line, a pole, a fence), and the images may be positively associated with the object type. The AI model may have filters that identify the correct object type or other relevant parameters. The AI model may be trained to positively recognize correct training images as belonging to the identified classification. The training images may also include negative classification data such as images, video, or other data that show non-related videos, or object types.

Training images 702 may be preprocessed by an input layer (not shown) to prepare the training images 702 for filtering through one or more hidden layers such as convolution layers and pooling layers 704. The convolution layers 704 may have filters with adjustable weights or biases that affect the weight given to the respective filter when processing data. The training images 702 may be processed through the convolution layers and pooling layers 704, and the resulting data is output to one or more fully-connected layers 708.

Fully-connected layers 706 provide classification for each image from training images 702. In certain embodiments, fully-connected layers 706 generate probabilities that each image of training images 702 belongs to a particular classification. In certain embodiments, a Softmax function is applied to data output from convolutional layers and pooling layers 704. Softmax is an activation function that scales numbers or unnormalized final scores (logits) into probabilities.

In certain embodiments, a threshold may be applied to the probabilities or other output generated by fully-connected layers 706 to determine whether the image affirmatively meets the classification criteria. For example, the system may use a 90% threshold for classification, and a training image 702 that has a greater than 90% chance of belonging to a particular class is affirmatively classified as being in the class. Alternatively, a training image 702 that has an 20% change of belonging to a particular class may be classified as being outside the class. In certain embodiments, the system may use a lower threshold when classifying training images 702 as being outside the class, with probabilities falling between the threshold resulting in the training image 702 being undefined or unknown with respect to the class. Therefore, the system may have a lower threshold of 10%, and a training image 702 identified as having a 10% chance of being in the class may be identified as affirmatively being outside of the class, while a 25% chance of the training image 702 being in the class may result in an undefined or unknown classification for the training image 702.

In certain embodiments, fully-connected layers 706 are feed forward neural networks. Fully-connected layers 706 may be densely connected, meaning that every neuron in the output is connected to every input neuron. In certain embodiments, in a fully-connected layer 706, every output neuron is connected to every input neuron through a different weight. This may be in contrast to a convolution layer in which the neurons are connected only to neighboring neurons within a width of a convolutional kernel or filter. However, in a convolutional layer, the weights may be shared among different neurons, which may allow convolutional layers to be used with a large number of neurons.

The input to fully-connected layers 706 is the output from the final convolutional layer or final pooling layer 704, which may be flattened and then fed into fully-connected layer 706. During training of an AI model, outputs from fully-connected layer 706 may be passed to a loss 708 that evaluates the results of the AI model processing and provides data used to adjust weights and biases of the convolutional layers 704 by back propagation/weight adjustment 712.

Loss 708 may specify how training penalizes the deviation between the predicted output of the network, and the true or correct data classification. Various loss functions can be used, depending on the specific task. In certain embodiments, loss 708 applies a loss function that estimates the error of a set of weights in convolution layers of a neural network. For example, errors in an output may be measured using cross-entropy. For example, in some training systems, the likelihood of any particular image belonging to a particular class is 1 or 0, as the class of the images is known. Cross entropy is the difference between an AI model predicted probability distribution given the dataset and the distribution of probabilities in the training dataset. Loss layer 708 may use a cross entropy analysis to determine loss for a training image 702 or set of training images 702.

Back propagation may allow application of the total loss determined by loss 708 back into the neural network to indicate how much of the loss every node is responsible for, and subsequently updating the weights in a way that minimizes the loss by giving the nodes with higher error rates lower weights, and vice versa. For example, in certain embodiments, a loss gradient may be calculated, and used, via back propagation/weight adjustment 712, for adjustment of the weights and biases in the convolution layers. A gradient descent algorithm may be used to change the weights so that the next evaluation of a training image 702 may reduce the error identified by loss 708, so that the optimization algorithm is navigating down the gradient (or slope) of error. Once training images 702 are exhausted, or the loss of the model falls below a particular threshold, the AI model may be saved, and used as a trained model 710.

Figure 8:
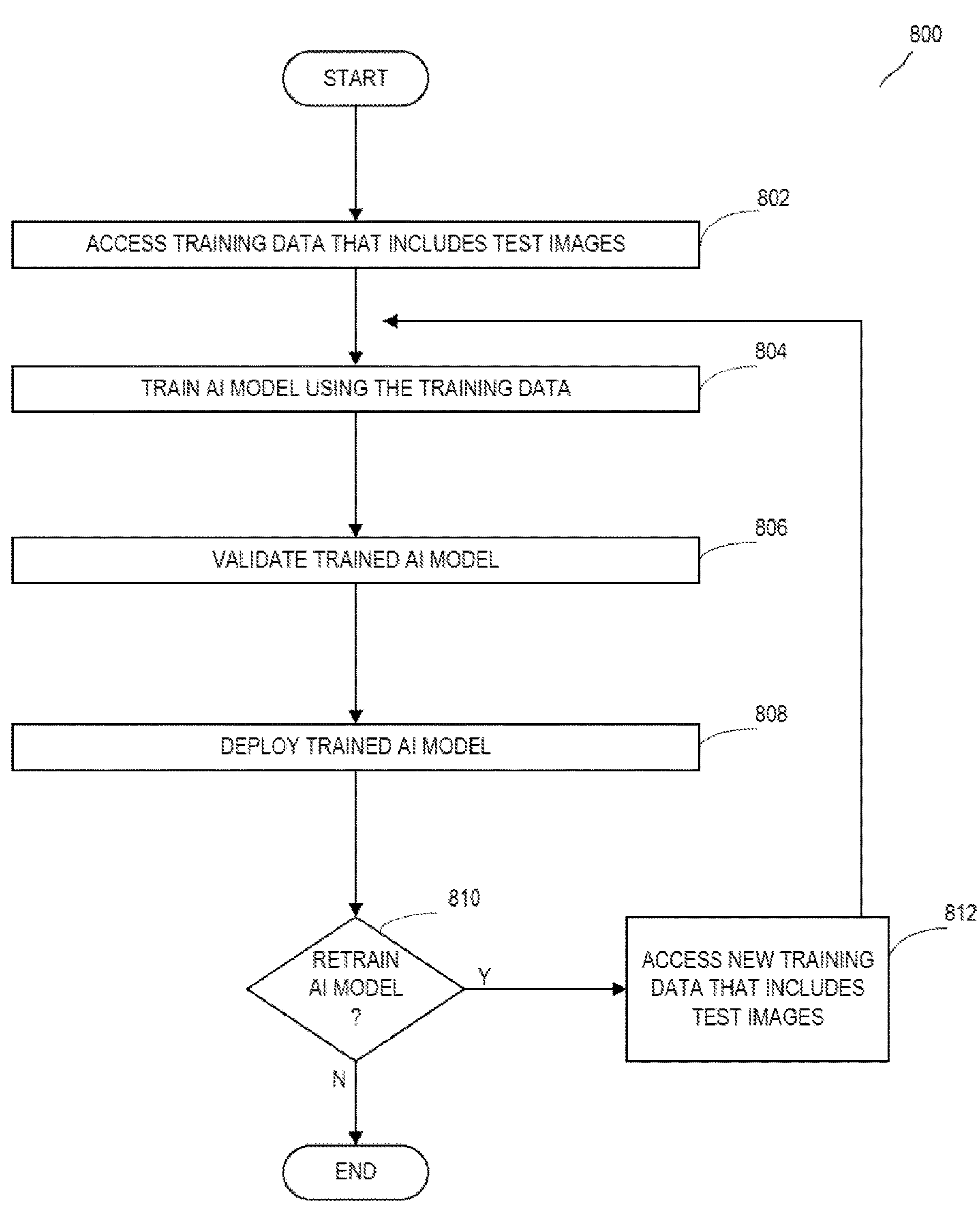
FIG. 8 illustrates a flow diagram of an example method for training an AI model for generating predicted load information for a vehicle component, according to certain embodiments.

FIG. 8 illustrates a flow diagram of an example method 800 for training an AI model for detecting object and distance to objects for rotor strike avoidance, according to certain embodiments. Method 800 may be performed, in whole or in part, by one or more computer systems, and may be embodied, in whole or in part, in a software program stored on a non-transitory computer-readable storage medium that is executed by one or more processors of the one or more computer systems. Method 800 is described as being performed by computer system 402; however, method 800 may be performed by any suitable processing device.

At step 802, computer system 402 (e.g., training logic 416) accesses training data 414. Training data 414 may include test images (e.g., test image information) that include one or more image objects 502 that correspond to physical objects 200 rotorcraft 100 may encounter during operation, including potentially low-visibility objects. The test images (e.g., test image information) may correspond to image information 425 that could be generated by one or more sensors 132 of rotorcraft 100. Training data 414 may further include proximity information (e.g., depth measurements).

In certain embodiments, training data 414 is collected from multiple test rotorcraft operations. The test rotorcraft operations may be actual rotorcraft operations or simulated rotorcraft operations.

At step 804, computer system 402 (e.g., training logic 416) may train AI model (e.g., in-training AI models 418) using training data 414 to generate trained AI models 420.

At step 806, computer system 402 (e.g., training logic 416) may validate trained AI model 420. In certain embodiments, certification or other assurance of the accuracy of the ability of the AI models 420 to correctly detect objects and proximity information may be desired. For example, trained AI models 420 may process validation data that is different from training data 414, and then results of trained AI models 420 processing the validation data (e.g., detecting objects and distances to objects) may be compared to the expected output values for the validation data. Using a validation data set that is different from a training data 414 may avoid false validation results by ensuring that trained AI models 420 do not simply give a known result for an image that it has already seen during initial training.

In certain embodiments, validating object detection and distances to objects may include verifying that trained AI models 420, after training, accurately detects and classifies image objects 502 from validation data and distances to objects 200 in the validation data according to a threshold. For example, using a 90% threshold, a trained AI model 420 trained to recognize ten image objects 502 may be validated against all ten image objects 502 by verifying that trained AI models 420 correctly recognizes 90% or more of all validation data for each of the ten image objects 502. Thus, a trained AI model 420 may be separately validated for each image object 502. In certain embodiments, if a trained AI model 420 is unable to be validated for each image object 502, the system may raise an exception, perform more training on the trained AI model 420, or take other steps to address the deficiencies in the trained AI model 420.

At step 808, computer system 402 (e.g., deployment logic 421) may deploy trained AI models 420 for use in analyzing actual image information 425. For example, computer system 402 may deploy trained AI models 420 for installation on a computer system of a vehicle (e.g., on computer system 404 of rotorcraft 100) for trained AI models 420 to be used for processing image information 425 from sensors 132 of rotorcraft 100 to detect objects and distance to objects for rotor strike avoidance.

At step 810, computer system 402 may determine whether to retrain trained AI models 420. Computer system 402 could make this determination automatically based on programmed conditions or in response to user input requesting retraining of trained AI models 420.

If computer system 402 determines at step 810 to retrain trained AI models 420, then at step 812, computer system 402 (e.g., training logic 416) may access new training data 414. Method 800 may then return to step 804 to access train AI models 420 using new training data 418 and continuing with steps 806, 808, and so on according to the new training data 418.

Returning to step 810, if computer system 402 determines at step 810 not to retrain AI model 820, method 800 ends.

Figure 9:
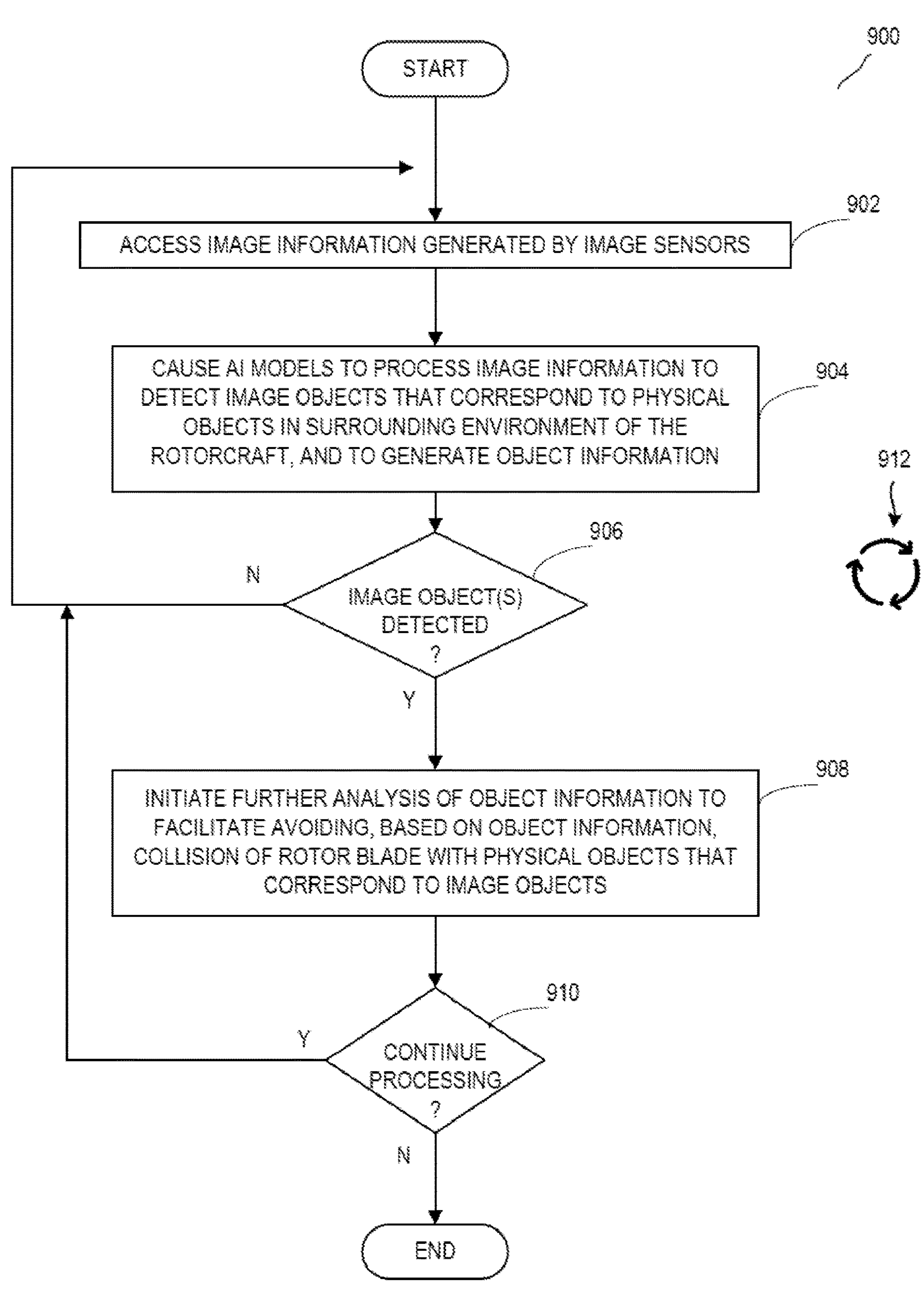
FIG. 9 illustrates a flow diagram of an example method for detecting objects for rotorcraft rotor strike avoidance, according to certain embodiments.

FIG. 9 illustrates a flow diagram of an example method 900 for detecting objects for rotorcraft rotor strike avoidance, according to certain embodiments. Method 900 may be performed, in whole or in part, by one or more computer systems, and may be embodied, in whole or in part, in a software program stored on a non-transitory computer-readable storage medium that is executed by one or more processors of the one or more computer systems. Method 900 is described as being performed by computer system 404; however, method 900 may be performed by any suitable processing device.

At step 902, computer system 404 (e.g., monitoring logic 422 and/or AI analysis logic 424) may access image information 425 generated by one or more image sensors 132. Image information 425 may be information for one or more images of at least a portion of an environment (e.g., within the fields of view of the one or more image sensors 132) surrounding rotorcraft 100. Image information 425 may be part of an output signal 423 received from the one or more sensors 132. A sensor 132 itself and/or monitoring logic 422 may perform certain pre-processing on the data signal to generate image information 425.

The one or more image sensors 132 may each have respective fields of view. The image information 425 generated by a particular image sensor 132 may correspond to a region of the surrounding environment of rotorcraft 100 within the field of view of that image sensor 132. To the extent method 900 includes processing image information 425 from multiple image sensors 132, those image sensors 132 may have the same or different respective fields of view (e.g., in terms of size), and those respective fields of view may cover the same or different regions of the surrounding environment of rotorcraft 100. In certain embodiments, at least two image sensors 132 may be oriented such that the respective fields of view of the at least two image sensors 132 cover at least partially different regions of the environment surrounding rotorcraft 100.

At step 904, computer system 404 (e.g., AI analysis logic 424) may cause one or more AI models (e.g., trained AI models 420) to process image information 425 to detect one or more image objects 502 from image information 425. The one or more image objects 502 may correspond to physical objects 200 in the surrounding environment of rotorcraft 100. The one or more AI models (e.g., trained AI models 420) may be configured to generate object information 426 that includes respective image locations and respective object-type classifications for the one or more image objects 502 detected from image information 425.

In certain embodiments, at least one of the one or more AI models (e.g., trained AI models 420) is an object detection model, and causing the one or more AI models (e.g., trained AI models 420) to process image information 425 to detect one or more image objects 502 from image information 425 includes causing the at least one AI model 420 to perform object detection on image information 425. In certain embodiments, causing the at least one AI model 420 to perform object detection on image information 425 includes causing the at least one AI model to detect one or more image objects 502 and to classify the one or more image objects 502, using an object-type classification for example.

In certain embodiments, the one or more AI models (e.g., trained AI model 420) include multiple layers arranged in a processing sequence. The multiple layers may include at least one first dense layer and at least one second dense layer. The multiple layers also may include at least one convolutional layer, at least one normalization layer, and at least one pooling layer between the at least one first dense layer and the at least one second dense layer. Of course, the one or more AI models may have other suitable designs. Example AI model details are described above with reference to FIGS. 6A-6B, and example combinations of AI models are described below with reference to FIG. 13.

In certain embodiments, the one or more AI models (e.g., trained AI models 420) have been trained prior to deployment for use in method 900. For example, the one or more AI models (e.g., trained AI models 420) may have been trained according to method 800, as described above with reference to FIG. 8.

In certain embodiments, the one or more AI models (e.g., trained AI models 420) have been trained, according to a training phase, to detect one or more image objects 502. The training phase may include accessing training data 414 that includes test images that include image objects for potential physical objects that could be present in the environment surrounding rotorcraft 100 and training the one or more AI models using training data 414.

In certain embodiments, method 900 includes executing the training phase for training the one or more AI models (trained AI models 420) to detect one or more image objects 502. For example, training logic 416 of computer system 402 may execute the training phase. Again, the training phase may include accessing training data 414 that includes test images that include image objects for potential physical objects that could be present in the environment surrounding rotorcraft 100 and training the one or more AI models using training data 414.

In certain embodiments, training data 414 is collected from a plurality of test rotorcraft operations, the test rotorcraft operations being actual rotorcraft operations or simulated rotorcraft operations.

At step 906, computer system 404 (e.g., monitoring logic 422 and/or AI analysis logic 424) may determine whether the analysis performed by the one or more AI models (e.g., trained AI models 420) detected any image objects 502 in image information 425. If computer system 404 (e.g., monitoring logic 422 and/or AI analysis logic 424) determines at step 906 that no image objects 502 were detected in image information 425 by the analysis performed by the one or more AI models (e.g., trained AI models 420), then method 900 may return to step 902 to await and subsequently process additional image information 425. If computer system 404 (e.g., monitoring logic 422 and/or AI analysis logic 424) determines at step 906 that image objects 502 were detected in image information 425 by the analysis performed by the one or more AI models (e.g., trained AI models 420), then method 900 may proceed to step 908.

At step 908, computer system 404 (e.g., monitoring logic 422 and/or AI analysis logic 424) may initiate, in response to detecting one or more image objects 502 from image information 425, further analysis of object information 426 for the one or more image objects 502 to facilitate avoiding, based on object information 426, a collision of a rotor blade 104 of rotorcraft 100 with the one or more physical objects 200 that correspond to the one or more image objects 502.

In certain embodiments, initiating, in response to detecting the one or more image objects 502 from image information 425, further analysis of object information 426 includes providing object information 426 to collision avoidance logic 432 to facilitate avoiding, based on object information 426, a collision of a rotor blade 104 of rotorcraft 100 with one or more physical objects 200 that correspond to the one or more image objects 502.

Although a single iteration of method 900 is described, in certain embodiments, method 900 is an iterative process, as indicated at iterative symbol 912, that may be repeated at suitable regular or irregular intervals.

Figure 10:
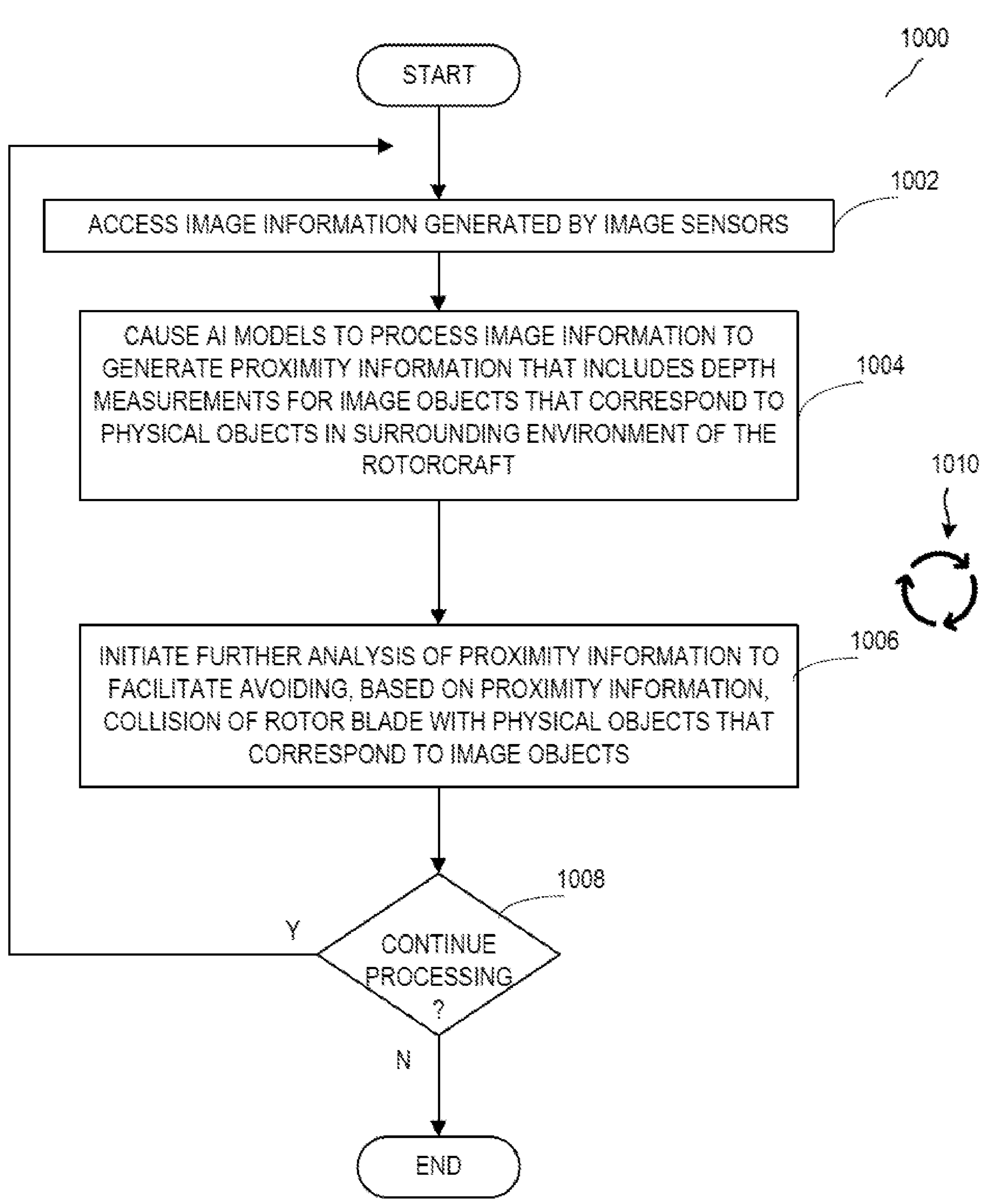
FIG. 10 illustrates a flow diagram of an example method for detecting distance to objects for rotorcraft rotor strike avoidance, according to certain embodiments.

FIG. 10 illustrates a flow diagram of an example method 1000 for detecting distance to objects for rotorcraft rotor strike avoidance, according to certain embodiments. Method 1000 may be performed, in whole or in part, by one or more computer systems, and may be embodied, in whole or in part, in a software program stored on a non-transitory computer-readable storage medium that is executed by one or more processors of the one or more computer systems. Method 1000 is described as being performed by computer system 404; however, method 1000 may be performed by any suitable processing device.

At step 1002, computer system 404 (e.g., monitoring logic 422 and/or AI analysis logic 424) may access image information 425 generated by one or more image sensors 132. Image information 425 may be information for one or more images of at least a portion of an environment (e.g., within the fields of view of the one or more image sensors 132) surrounding rotorcraft 100. Image information 425 may be part of an output signal 423 received from the one or more sensors 132. A sensor 132 itself and/or monitoring logic 422 may perform certain pre-processing on the data signal to generate image information 425.

As described above with reference to method 900, the one or more image sensors 132 may each have respective fields of view. The image information 425 generated by a particular image sensor 132 may correspond to a region of the surrounding environment of rotorcraft 100 within the field of view of that image sensor 132. To the extent method 900 includes processing image information 425 from multiple image sensors 132, those image sensors 132 may have the same or different respective fields of view (e.g., in terms of size), and those respective fields of view may cover the same or different regions of the surrounding environment of rotorcraft 100. In certain embodiments, at least two image sensors 132 may be oriented such that the respective fields of view of the at least two image sensors 132 cover at least partially different regions of the environment surrounding rotorcraft 100.

At step 1004, computer system 404 (e.g., AI analysis logic 424) may cause one or more AI models (e.g., trained AI models 420) to process image information 425 to generate proximity information 427 for image information 425. Proximity information 427 may include depth measurements for image information 425, such as depth measurements for some or all of the pixels (or other subdivisions) of the one or more images of image information 425. In certain embodiments, the depth measurements of proximity information 427 include depth measurements for one or more image objects 502 (whether or not those image objects 502 are specifically detected as part of the analysis performed at step 1004) from image information 425 that correspond to one or more physical objects 200 in the surrounding environment of rotorcraft 100.

In certain embodiments, at least one of the one or more AI models (e.g., trained AI models 420) is a depth estimation model (e.g., a monocular depth estimation model), and causing the one or more AI models (e.g., trained AI models 420) to process image information 425 to generate proximity information from image information 425 includes causing the at least one AI model to infer depth information from image information 425.

For example, in certain embodiments, a first AI model of the one or more AI models (e.g., trained AI models 420) is a depth estimation model, and causing the one or more AI models to process image information 425 to generate proximity information 427 includes causing the first AI model to determine the depth estimates from image information 425 to determine the depth measurements for the one or more image objects 502.

In certain embodiments, the one or more AI models (e.g., trained AI model 420) include multiple layers arranged in a processing sequence. The multiple layers may include at least one first dense layer and at least one second dense layer. The multiple layers also may include at least one convolutional layer, at least one normalization layer, and at least one pooling layer between the at least one first dense layer and the at least one second dense layer. Of course, the one or more AI models may have other suitable designs. Example AI model details are described above with reference to FIGS. 6A-6B, and example combinations of AI models are described below with reference to FIG. 13.

In certain embodiments, the one or more AI models (e.g., trained AI models 420) have been trained prior to deployment for use in method 900. For example, the one or more AI models (e.g., trained AI models 420) may have been trained according to method 800, as described above with reference to FIG. 8.

In certain embodiments, the one or more AI models (e.g., trained AI models 420) have been trained, according to a training phase, to generate proximity information. The training phase may include accessing training data 414 that includes test images that include image objects for potential physical objects that could be present in the environment surrounding rotorcraft 100 and training the one or more AI models using training data 414.

In certain embodiments, method 1000 includes executing the training phase for training the one or more AI models (trained AI models 420) to generate proximity information. For example, training logic 416 of computer system 402 may execute the training phase. Again, the training phase may include accessing training data 414 that includes test images that include image objects for potential physical objects that could be present in the environment surrounding rotorcraft 100 and training the one or more AI models using training data 414.

In certain embodiments, training data 414 is collected from a plurality of test rotorcraft operations, the test rotorcraft operations being actual rotorcraft operations or simulated rotorcraft operations.

At step 1006, computer system 404 (e.g., monitoring logic 422 and/or AI analysis logic 424) may initiate, in response to generating proximity information 427 from image information 425, further analysis of proximity information 427 to facilitate avoiding, based on proximity information 427, a collision of a rotor blade 104 of rotorcraft 100 with the one or more physical objects 200. For example, computer system 404 (e.g., monitoring logic 422 and/or AI analysis logic 424) may initiate, in response to generating proximity information 427 from image information 425, further analysis of proximity information 427 for the one or more image objects 502 to facilitate avoiding, based on proximity information 427, a collision of a rotor blade 104 of rotorcraft 100 with the one or more physical objects 200 that correspond to the one or more image objects 502.

In certain embodiments, initiating, in response to generating proximity information 427 from image information 425, further analysis of proximity information 427 includes providing proximity information 427 to collision avoidance logic 432 to facilitate avoiding, based on object information 426, a collision of a rotor blade 104 of rotorcraft 100 with one or more physical objects 200 that correspond to the one or more image objects 502.

Although a single iteration of method 1000 is described, in certain embodiments, method 1000 is an iterative process, as indicated at iterative symbol 1010, that may be repeated at suitable regular or irregular intervals.

FIG. 11 illustrates a flow diagram of an example method 1100 for detecting objects and distance to objects for rotorcraft rotor strike avoidance, according to certain embodiments. Method 1100 may be performed, in whole or in part, by one or more computer systems, and may be embodied, in whole or in part, in a software program stored on a non-transitory computer-readable storage medium that is executed by one or more processors of the one or more computer systems. Method 1100 is described as being performed by computer system 404; however, method 1100 may be performed by any suitable processing device.

At step 1102, computer system 404 (e.g., monitoring logic 422 and/or AI analysis logic 424) may access first image information 425 generated by a first subset of one or more image sensors 132. The first image information 425 may be information for one or more images of at least a portion of an environment (e.g., within the fields of view of the one or more image sensors 132) surrounding rotorcraft 100. The first image information 425 may be part of an output signal 423 received from the first subset of one or more sensors 132. A sensor 132 itself and/or monitoring logic 422 may perform certain pre-processing on the data signal to generate the first image information 425. The fields of view of the first subset of the one or more image sensors 132 may be as described above with reference to step 902 of FIG. 9.

Continuing with FIG. 11, at step 1104, computer system 404 (e.g., AI analysis logic 424) may cause a first one or more AI models (e.g., trained AI models 420) to process the first image information 425 to detect one or more first image objects 502 from first image information 425. The first one or more image objects 502 may correspond to physical objects 200 in the surrounding environment of rotorcraft 100. The first one or more AI models (e.g., trained AI models 420) may be configured to generate object information 426 that includes respective image locations and respective object-type classifications for the first one or more image objects 502 detected from first image information 425.

In certain embodiments, at least one of the first one or more AI models (e.g., trained AI models 420) is an object detection model, and causing the first one or more AI models (e.g., trained AI models 420) to process the first image information 425 to detect a first one or more image objects 502 from first image information 425 includes causing the at least one AI model of the first one or more AI models to perform object detection on first image information 425. In certain embodiments, causing the at least one AI model to perform object detection on the first image information 425 includes causing the at least one AI model to detect the first one or more image objects 502 and to classify the first one or more image objects 502, using an object-type classification for example.

In certain embodiments, the first one or more AI models (e.g., trained AI model 420) include multiple layers arranged in a processing sequence. The multiple layers may include at least one first dense layer and at least one second dense layer. The multiple layers also may include at least one convolutional layer, at least one normalization layer, and at least one pooling layer between the at least one first dense layer and the at least one second dense layer. Of course, the one or more AI models may have other suitable designs. Example AI model details are described above with reference to FIGS. 6A-6B, and example combinations of AI models are described below with reference to FIG. 13.

In certain embodiments, the first one or more AI models (e.g., trained AI models 420) have been trained prior to deployment for use in method 1100. For example, the first one or more AI models (e.g., trained AI models 420) may have been trained according to method 800, as described above with reference to FIG. 8. In certain embodiments, method 1100 includes training of the first one or more AI models (e.g., trained AI models 420). Training of the first one or more AI models (e.g., trained AI models 420) may be similar to that described above with reference to step 904 of FIG. 9.

Continuing with FIG. 11, at step 1106, computer system 404 (e.g., monitoring logic 422 and/or AI analysis logic 424) may access second image information 425 generated by a second subset of one or more image sensors 132. The second image information 425 may be information for one or more images of at least a portion of an environment (e.g., within the fields of view of the one or more image sensors 132) surrounding rotorcraft 100. The second image information 425 may be part of an output signal 423 received from the one or more sensors 132. A sensor 132 itself and/or monitoring logic 422 may perform certain pre-processing on the data signal to generate second image information 425. The fields of view of the second subset of the one or more image sensors 132 may be as described above with reference to step 1002 of FIG. 10.

Continuing with FIG. 11, at step 1108, computer system 404 (e.g., AI analysis logic 424) may cause a second one or more AI models (e.g., trained AI models 420) to process the second image information 425 to generate proximity information 427 for the second image information 425. Proximity information 427 may include depth measurements for the second image information 425, such as depth measurements for some or all of the pixels (or other subdivisions) of the one or more images of the second image information 425. In certain embodiments, the depth measurements of proximity information 427 include depth measurements for one or more image objects 502 (whether or not those image objects 502 are specifically detected as part of the analysis performed at step 1108) from second image information 425 that correspond to one or more physical objects in the surrounding environment of rotorcraft 100.

In certain embodiments, at least one of the second one or more AI models (e.g., trained AI models 420) is a depth estimation model (e.g., a monocular depth estimation model), and causing the second one or more AI models (e.g., trained AI models 420) to process second image information 425 to generate proximity information 427 from second image information 425 includes causing the at least one AI model to infer depth information from the second image information 425.

For example, in certain embodiments, a first AI model of the second one or more AI models (e.g., trained AI models 420) is a depth estimation model, and causing the second one or more AI models to process image information 425 to generate proximity information 427 includes causing the first AI model to determine the depth estimates from the second image information 425 to determine the depth measurements for the second one or more image objects 502.

In certain embodiments, the second one or more AI models (e.g., trained AI model 420) include multiple layers arranged in a processing sequence. The multiple layers may include at least one first dense layer and at least one second dense layer. The multiple layers also may include at least one convolutional layer, at least one normalization layer, and at least one pooling layer between the at least one first dense layer and the at least one second dense layer. Of course, the second one or more AI models may have other suitable designs. Example AI model details are described above with reference to FIGS. 6A-6B, and example combinations of AI models are described below with reference to FIG. 13.

In certain embodiments, the second one or more AI models (e.g., trained AI models 420) have been trained prior to deployment for use in method 1100. For example, the second one or more AI models (e.g., trained AI models 420) may have been trained according to method 800, as described above with reference to FIG. 8. In certain embodiments, method 1100 includes training of the second one or more AI models (e.g., trained AI models 420). Training of the second one or more AI models (e.g., trained AI models 420) may be similar to that described above with reference to step 1004 of FIG. 10.

In certain embodiments, at least one of the second one or more objects (identified using proximity information 427) corresponds to at least one of the first one or more objects (identified using object information 426) such that the depth measurements include depth measurements for at least one of the first one or more objects detected using object information 426.

In certain embodiments, the first subset of the one or more image sensors 132 (e.g., associated with step 1102) and the second subset of the one or more image sensors 132 (e.g., associated with step 1106) at least partially overlap. For example, at least some of the image sensors 132 from which first image information 425 is used to determine object information 426 and at least some of the image sensors 132 from which second image information 425 is used to determine proximity information 427 are the same image sensors 132.

In certain embodiments, the first image information 425 and the second image information 425 at least partially overlap. For example, at least some of the first image information 425 used to determine object information 426 and at least some of the second image information 425 used to determine proximity information 427 include the same image information 425.

In certain embodiments, the first one or more AI models (e.g., used to generate object information 426) and the second one or more AI models (e.g., used to generate proximity information 427) at least partially overlap. For example, at least some of the same trained AI models 420 may be used to determine object information 426 and proximity information 427.

Continuing with FIG. 11, at step 1106, computer system 404 (e.g., monitoring logic 422 and/or AI analysis logic 424) may initiate further analysis of object information 426 and/or proximity information 427 to facilitate avoiding, based on object information 426 and/or proximity information 427, a collision of the rotor blade with one or more physical objects 200 that correspond to the one or more image objects 502.

In certain embodiments, initiating further analysis of object information 426 and/or proximity information 427 includes providing object information 426 and/or proximity information 427 to collision avoidance logic 432 to facilitate avoiding, based on object information 426 and/or proximity information 427, a collision of a rotor blade 104 of rotorcraft 100 with one or more physical objects 200 that correspond to the one or more image objects 502.

Although a single iteration of method 1100 is described, in certain embodiments, method 1100 is an iterative process, as indicated at iterative symbol 1112, that may be repeated at suitable regular or irregular intervals.

Figure 12:
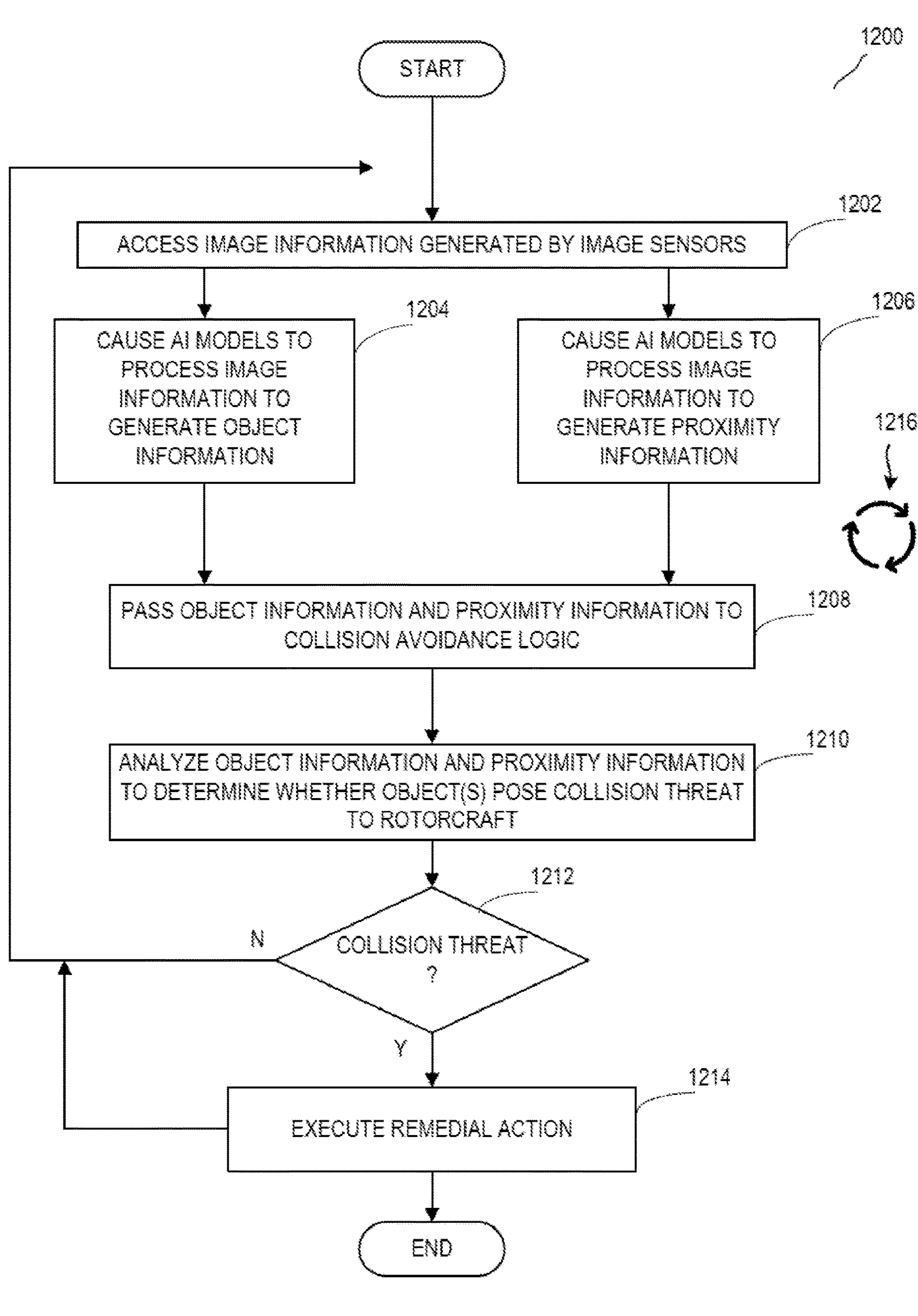
FIG. 12 illustrates a flow diagram of an example method for detecting objects and distance to objects for rotorcraft rotor strike avoidance, according to certain embodiments.

FIG. 12 illustrates a flow diagram of an example method 1200 for detecting objects and distance to objects for rotorcraft rotor strike avoidance, according to certain embodiments. Method 1200 may be performed, in whole or in part, by one or more computer systems, and may be embodied, in whole or in part, in a software program stored on a non-transitory computer-readable storage medium that is executed by one or more processors of the one or more computer systems. Method 1200 is described as being performed by computer system 404; however, method 1200 may be performed by any suitable processing device.

At step 1202, computer system 404 (e.g., monitoring logic 422 and/or AI analysis logic 424) may access first image information 425 generated by a first subset of one or more image sensors 132. Step 1202 may be similar to steps 902, 1002, and 1102 of FIGS. 9, 10, and 11, respectively, the details of which are not repeated.

At step 1204, computer system 404 (e.g., AI analysis logic 424) may cause one or more AI models (e.g., trained AI models 420) to process image information 425 to generate object information 426. Step 1204 may be similar to steps 904 and 1104 of FIGS. 9 and 11, respectively, the details of which are not repeated.

At step 1206, computer system 404 (e.g., AI analysis logic 424) may cause one or more AI models (e.g., trained AI models 420) to process image information 425 to generate proximity information 427. Step 1206 may be similar to steps 1004 and 1108 of FIGS. 10 and 11, respectively, the details of which are not repeated.

At step 1208, computer system 404 (e.g., AI analysis logic 424) may pass object information 426 and proximity information 427 to collision avoidance logic 432 for further analysis.

At step 1210, computer system 404 (e.g., collision avoidance logic 432) may analyze object information 426 and proximity information 427 to determine whether physical objects 200 in a surrounding environment of rotorcraft 100, as determined from image objects 502 identified from object information 426 and/or proximity information 427, pose a potential collision threat to rotorcraft 100. For example, computer system 404 (e.g., collision avoidance logic 432) may analyze object information 426 and proximity information 427 to determine whether physical objects 200 in a surrounding environment of rotorcraft 100 pose a potential threat for rotor strike collision with a rotor blade 104 of rotorcraft 100.

At step 1212, if computer system 404 (e.g., collision avoidance logic 432) determines that a collision threat is not posed, then method 1200 may return to step 1202 to access new image information 425.

At step 1212, if computer system 404 (e.g., collision avoidance logic 432) determines that a collision threat is posed, then at step 1214 computer system 404 (e.g., collision avoidance logic 432) may initiate execution of a remedial action. For example, collision avoidance logic 432 may initiate an annunciation to alert a pilot of rotorcraft 100 of the potential threat. The annunciation could include audible feedback (e.g., an audible announcement and/or alarm), visible feedback (e.g., one or more lights, a visible display, and/or other visible alerts), tactile feedback (e.g., a vibration of a seat or handheld control (e.g., cyclic stick 302 and/or collective stick 304), and/or any other suitable type of annunciation. As another example, collision avoidance logic 432 may send an instruction to cause a suitable system of rotorcraft 100 to initiate a corrective flight action to avoid the collision, if possible. Computer system 404 (e.g., collision avoidance logic 432) may initiate any of these or other possible remedial actions, alone or in combination.

Method 1200 may return to step 1202 to access new image information 425. Alternatively, if flight operations have ended, method 1200 may end.

Although a single iteration of method 1200 is described, in certain embodiments, method 1200 is an iterative process, as indicated at iterative symbol 1216, that may be repeated at suitable regular or irregular intervals.

Methods 800, 900, 1000, 1100, and 1200 may be combined and performed using the systems and apparatuses described herein. Although shown in a logical order, the arrangement and numbering of the steps of methods 800, 900, 1000, 1100, and 1200 are not intended to be limited. The steps of methods 800, 900, 1000, 1100, and 1200 may be performed in any suitable order or concurrently with one another as may be apparent to a person of skill in the art.

Figure 13:
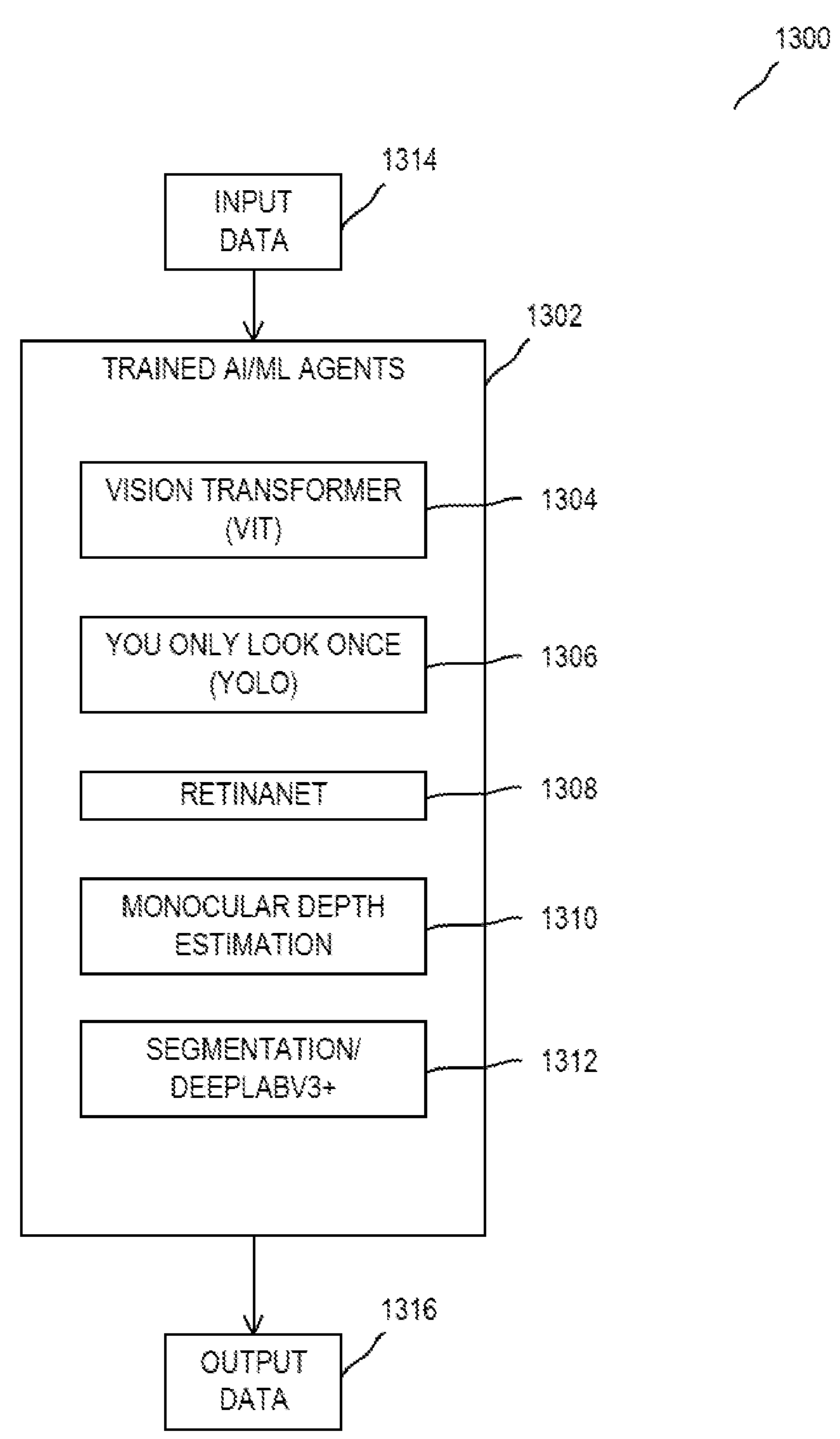
FIG. 13 illustrates a set of example AI models that may be used for detecting objects and distance to objects, according to certain embodiments.

FIG. 13 illustrates a block diagram of a system 1300 that includes a set of example AI models 1302 that may be used for detecting objects and distance to objects, according to certain embodiments. In certain embodiments, AI models 1302 may correspond to in-training AI models 418 (prior to/during training) and/or trained AI models 420 (once trained).

In the illustrated example, AI models 1302 include one or more different types of AI models. In particular, AI models 1302 include vision transformer (ViT) models 1304, objection detection or recognition models such as you-only-look-once (YOLO) models 1306 and/or RetinaNet models 1308, depth estimation models 1310 (e.g., monocular depth estimation models), segmentation models 1312 (e.g., DeepLabV3+ models), and/or any other suitable AI models. Although AI models 1302 are described as including particular example AI models, AI models 1302 may include any suitable combination of one or more AI models of any suitable type.

AI models 1302 may be provided with input data 1314, which may include image information 425, and may attempt to classify input data 1314, to generate object information 426 and/or proximity information 427, providing object information 426 and/or proximity information 427 as output data 1316. AI models 1302 may process input data 1314 in combination, considering the outputs of one or more other AI models of AI models 1302, or may process input data individually without considering the outputs of one or more other AI models of AI models 1302.

Figure 14:
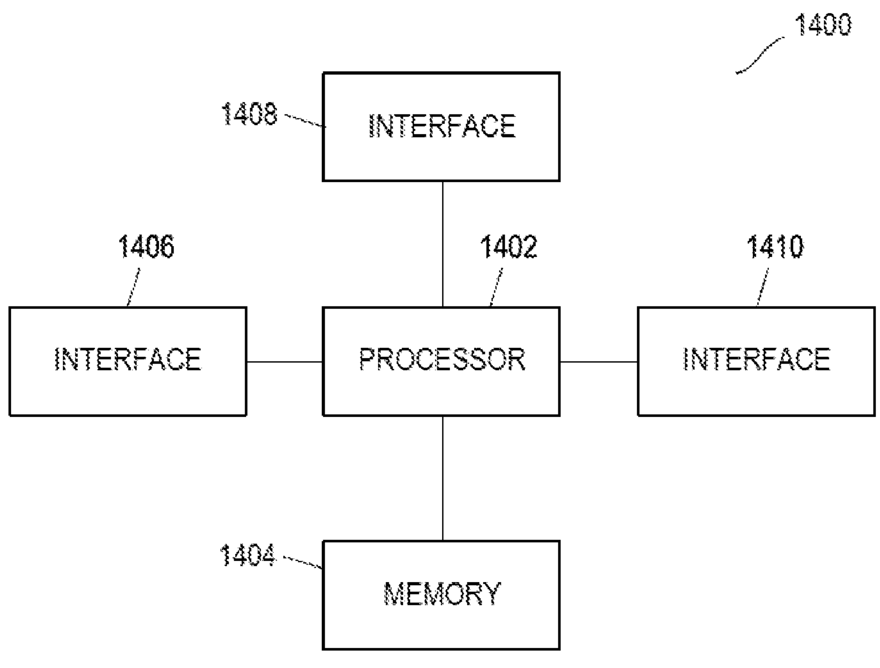
FIG. 14 is a block diagram of an example computer system, according to certain embodiments.

FIG. 14 is a block diagram of an example computer system 1400, according to certain embodiments. Computer system 1400 can be configured to perform one or more operations related to aircraft computer systems 114, including flight control computer 316, engine control computer 318, computer system 402, computer system 404, and/or other suitable computer systems (e.g., computer system 134) or other components of flight control system 300. For example, these systems and methods may be implemented using one or more computer systems 1400. Further, any processing and analysis can be partly or fully performed by the computer system 1400. Computer system 1400 can be partly or fully integrated with other aircraft computer systems or can be partly or fully removed from rotorcraft 100.

Computer system 1400 may be implemented using any suitable combination of hardware, firmware, and software. Computer system 1400 includes processor 1402, one or more memories 1404, and interfaces 1406-1410, which may (or may not) be arranged as shown. Computer system 1400 may include any suitable number of processors 1402, memories 1404, and interfaces 1406-1410.

Processor 1402 may be any component or collection of components adapted to perform computations and/or other processing related tasks. Processor 1402 may be a programmable logic device, a microcontroller, a microprocessor, any suitable processing device, or any suitable combination of the preceding.

Memory 1404 may be any component or collection of components adapted to store programming and/or instructions for execution by the processor 1402. Memory 1404 may include any one or a combination of volatile or non-volatile local or remote devices suitable for storing information. For example, memory 1404 may include random access memory ("RAM"), read-only memory ("ROM"), magnetic storage devices, optical storage devices, or any other suitable information storage device or a combination of these devices. Memory 1404 may be, in whole or in part, local to or remote from rotorcraft 100. In an embodiment, the memory 1404 includes a non-transitory computer-readable medium. Memory 1404 may store one or more computer programs for execution by processor 1402, the one or more computer programs includes instructions for performing operations and that when executed by the process cause the process to perform those operations.

Interfaces 1406, 1408, 1410 may be any component or collection of components that allow computer system 1400 to communicate with other devices/components and/or a user. For example, one or more of the interfaces 1406, 1408, 1410 may be adapted to communicate data, control, or management messages from the processor 1402 to applications installed on the host device and/or a remote device. As another example, one or more of the interfaces 1406, 1408, 1410 may be adapted to allow a user or user device (e.g., personal computer (PC), etc.) to interact/communicate with aircraft computer systems 114. Aircraft computer systems 114 may include additional components not depicted, such as long term storage (e.g., non-volatile memory, etc.).

Embodiments of this disclosure may provide none, some, or all of the following technical advantages. Furthermore, other advantages may be described in or understood from this disclosure.

Certain embodiments train AI models to detect image objects in image information received from sensors, and those image objects may correspond to physical objects-including low-visibility objects—that may pose a potential collision threat to rotorcraft. Once deployed for use in actual rotorcraft operation, those trained AI models may be able to provide valuable information about physical objects, including potential rotor strike collision hazards, that may be present in an environment in which the rotorcraft is operating. The capabilities of the object detection AI models may allow even low-visibility objects, such as power lines, power poles, fences, rotor blades (e.g., of other rotorcraft), to be detected as image objects in image information received from image sensors of the rotorcraft, and those image objects may correspond to physical objects that may pose a potential collision threat to the rotorcraft. Object information generated based on the output of the one or more AI models may be provided to collision avoidance logic of the rotorcraft to alert the pilot, automatically avoid the collision, or take other remedial action.

Certain embodiments train AI models to generate proximity information (e.g., depth information) from image information for environments in which a rotorcraft may operate, including environments in which objects that pose potential rotor strike collision hazards may exist. Once deployed for use in actual rotorcraft operation, those trained machine learning models may be able to provide valuable depth information, including information about potential rotor strike collision hazards, that may be present in an environment in which the rotorcraft is operating. The capabilities of the depth estimation AI models may allow even low-visibility objects, such as power lines, power poles, fences, rotor blades (e.g., of other rotorcraft), to be detected as image objects in image information received from image sensors of the rotorcraft, and those image objects may correspond to physical objects that may pose a potential collision threat to the rotorcraft. Proximity information generated based on the output of the one or more AI models may be provided to collision avoidance logic of the rotorcraft to alert the pilot, automatically avoid the collision, or take other remedial action.

Certain embodiments may combine AI object detection and depth estimation techniques to provide an even more capable system that can detect objects, including potentially low visibility objects, to facilitate avoiding rotor strike collisions and other types of collisions.

Through interaction with collision avoidance logic, certain embodiments may provide improved situational awareness to a pilot of a rotorcraft, allowing the pilot to potentially avoid a collision, and/or may implement automated remedial actions to automatically avoid a collision.

Certain of these features, individually or collectively, may improve safety when operating an aircraft, such as a rotorcraft, in an area where low-visibility objects may be present, such as by reducing or eliminating the possibility of a rotor strike of the low-visibility object.

Example embodiments of this disclosure are summarized here. Other embodiments can also be understood from the entirety of the specification as well as the claims filed herein.

Example 1. A rotorcraft includes a fuselage and a rotor system that includes a rotor blade coupled to a rotor mast mounted to the fuselage. The rotorcraft includes one or more image sensors configured to generate image information for a surrounding environment of the rotorcraft, at least one processor, and at least one non-transitory computer-readable storage medium storing a program for execution by the at least one processor. The program includes instructions to access first image information generated by a first subset of the one or more image sensors, and to cause a first one or more artificial intelligence (AI) models to process the first image information to detect one or more first image objects from the first image information that correspond to physical objects in the surrounding environment of the rotorcraft. The first one or more AI models are configured to generate object information that includes respective image locations and respective object-type classifications for the first one or more image objects detected from the first image information. The program includes instructions to initiate, in response to detecting the one or more first image objects from the image information, further analysis of object information for the one or more first image objects to facilitate avoiding, based on the object information, a collision of the rotor blade with the one or more first physical objects that correspond to the one or more first image objects.

Example 2. The rotorcraft of Example 1, where the first one or more AI models have been trained, according to a training phase, to detect the one or more image objects, the training phase including: accessing training data that includes test images that include image objects for potential physical objects that could be present in the environment surrounding the rotorcraft; and training the first one or more AI models using the training data.

Example 3. The rotorcraft of any one of Examples 1-2, where the program further includes instructions to: access second image information generated by a second subset of the one or more image sensors; cause a second one or more AI models to process the second image information to generate proximity information for the second image information, the proximity information including depth measurements for one or more second image objects from the second image information that correspond to one or more second physical objects in the surrounding environment of the rotorcraft; and provide the proximity information to collision avoidance logic to facilitate avoiding, based on the proximity information, a collision of the rotor blade with the one or more second physical objects.

Example 4. The rotorcraft of Example 3, where at least one of the second one or more objects corresponds to at least one of the first one or more objects such that the depth measurements comprise depth measurements for the at least one of the first one or more objects.

Example 5. The rotorcraft of any one of Examples 3-4, where: the first subset of the one or more image sensors and the second subset of the one or more image sensors at least partially overlap; the first image information and the second image information at least partially overlap; and the first one or more AI models and the second one or more AI models at least partially overlap.

Example 6. The rotorcraft of any one of Examples 1-5, where: a first AI model of the first one or more AI models is an object detection model; and the instructions to cause the first one or more AI models to process the first image information comprise instructions to cause the first AI model to perform object detection on the first image information, including detecting the first one or more image objects and classifying the first one or more image objects.

Example 7. The rotorcraft of any one of Examples 1-6, where: the first image information is part of one or more data signals received from the first subset of the one or more image sensors; and the program further includes instructions to perform pre-processing on the one or more data signals prior to causing the first one or more AI models to process the first image information.

Example 8. The rotorcraft of any one of Examples 1-7, where initiating, in response to detecting the first one or more image objects from the first image information, further analysis of the object information includes providing the object information to collision avoidance logic to facilitate avoiding, based on the object information, a collision of the rotor blade with the one or more first physical objects.

Example 9. The rotorcraft of any one of Examples 1-8, where the first image information corresponds to a plurality of images captured by the first subset of the one or more image sensors.

Example 10. A method includes accessing image information generated by one or more image sensors configured to generate the image information for a surrounding environment of a rotorcraft. The method includes causing one or more AI models to process the image information to generate proximity information for the image information. The proximity information includes depth measurements for one or more image objects from the image information that correspond to one or more physical objects in the surrounding environment of the rotorcraft. The method includes initiating, in response to generating the proximity information from the image information, further analysis of the proximity information for the one or more image objects to facilitate avoiding, based on the proximity information, a collision of a rotor blade of the rotorcraft with the one or more physical objects that correspond to the one or more image objects.

Example 11. The method of Example 10, where the one or more AI models have been trained, according to a training phase, to generate the proximity information, the training phase including: accessing training data that includes test images that include image objects for potential physical objects that could be present in the environment surrounding the rotorcraft; and training the one or more AI models using the training data.

Example 12. The method of any one of Examples 10-11, further including executing a training phase for training the one or more AI models to generate the proximity information, the training phase including: accessing training data that includes test images that include image objects for potential physical objects that could be present in the environment surrounding the rotorcraft; and training the one or more AI models using the training data.

Example 13. The method of Example 12, where the training data is collected from a plurality of test rotorcraft operations, the test rotorcraft operations being actual rotorcraft operations or simulated rotorcraft operations.

Example 14. The method of any one of Examples 10-13, where: a first AI model of the one or more AI models is a depth estimation model; and causing the one or more AI models to process the image information to generate the proximity information includes causing the first AI model to determine the depth estimates from the image information to determine the depth measurements for the one or more image objects.

Example 15. The method of any one of Examples 10-14, where: a first image sensor of the one or more image sensors has a first field of view; a second image sensor of the one or more image sensors has a second field of view; and the first image sensor and the second image sensor are oriented such that the first field of view and the second field of view cover at least partially different regions of the environment of the rotorcraft.

Example 16. The method of any one of Examples 10-15, where initiating, in response to generating the proximity information from the image information, further analysis of the proximity information includes providing the proximity information to collision avoidance logic to facilitate avoiding, based on the proximity information, a collision of the rotor blade with the one or more physical objects.

Example 17. The method of any one of Examples 10-16, where the image information corresponds to a plurality of images captured by the one or more image sensors.

Example 18. A system includes at least one processor and at least one non-transitory computer-readable storage medium storing at least one artificial intelligence model and storing a program for execution by the at least one processor. The program includes instructions to access image information generated by one or more image sensors, the image information for a surrounding environment of a rotorcraft. The program includes instructions to cause one or more AI models to process the image information to detect one or more image objects from the image information that correspond to physical objects in the surrounding environment of the rotorcraft. The one or more AI models are configured to generate object information including respective image locations and respective object-type classifications for the one or more image objects detected from the image information. The program includes instructions to initiate, in response to detecting the one or more image objects from the image information, further analysis of object information for the one or more image objects to facilitate avoiding, based on the object information, a collision of a rotor blade of the rotorcraft with the one or more physical objects that correspond to the one or more image objects.

Example 19. The system of Example 18, where the program further includes instructions to execute a training phase for training the one or more AI models to detect the one or more image objects, the training phase including: accessing training data that includes test images that include image objects for potential physical objects that could be present in the environment surrounding the rotorcraft; and training the one or more AI models using the training data.

Example 20. The system of Example 19, where the training data is collected from a plurality of test rotorcraft operations, the test rotorcraft operations being actual rotorcraft operations or simulated rotorcraft operations.

Illustrative embodiments of the system and method of the present disclosure are described herein. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

While this disclosure has been described with reference to illustrative embodiments, this description is not intended to be construed in a limiting sense. Various modifications and combinations of the illustrative embodiments, as well as other embodiments of this disclosure, will be apparent to persons skilled in the art upon reference to the description. It is therefore intended that the appended claims encompass any such modifications or embodiments.

What is claimed is:

1. A rotorcraft, comprising:

a fuselage;

a rotor system comprising a rotor blade coupled to a rotor mast mounted to the fuselage;

one or more image sensors configured to generate image information for a surrounding environment of the rotorcraft;

at least one processor; and at least one non-transitory computer-readable storage medium storing a program for execution by the at least one processor, the program including instructions to:

access first image information generated by a first subset of the one or more image sensors;

cause a first one or more artificial intelligence (AI) models to process the first image information to detect one or more first image objects from the first image information that correspond to one or more first physical objects in the surrounding environment of the rotorcraft, the first one or more AI models configured to generate object information comprising respective image locations and respective object-type classifications for the one or more first image objects detected from the first image information, wherein the first one or more AI models have been trained, according to a training phase, to detect the one or more first image objects, the training phase comprising:

accessing training data that comprises test images that include image objects for potential physical objects that could be present in the surrounding environment of the rotorcraft; and training the first one or more AI models using the training data; and initiate, in response to detecting the one or more first image objects from the first image information, further analysis of the object information for the one or more first image objects to facilitate avoiding, based on the object information, a collision of the rotor blade with the one or more first physical objects that correspond to the one or more first image objects.

2. The rotorcraft of claim 1, wherein the program further includes instructions to:

access second image information generated by a second subset of the one or more image sensors;

cause a second one or more AI models to process the second image information to generate proximity information for the second image information, the proximity information comprising depth measurements for one or more second image objects from the second image information that correspond to one or more second physical objects in the surrounding environment of the rotorcraft; and provide the proximity information to collision avoidance logic to facilitate avoiding, based on the proximity information, a collision of the rotor blade with the one or more second physical objects.

3. The rotorcraft of claim 2, wherein at least one of the one or more second image objects corresponds to at least one of the one or more first image objects such that the depth measurements comprise depth measurements for the at least one of the one or more image first objects.

4. The rotorcraft of claim 2, wherein:

the first subset of the one or more image sensors and the second subset of the one or more image sensors at least partially overlap;

the first image information and the second image information at least partially overlap; and the first one or more AI models and the second one or more AI models at least partially overlap.

5. The rotorcraft of claim 1, wherein:

a first AI model of the first one or more AI models is an object detection model; and the instructions to cause the first one or more AI models to process the first image information comprise instructions to cause the first AI model to perform object detection on the first image information, including detecting the one or more first image objects and classifying the one or more first image objects.

6. The rotorcraft of claim 1, wherein:

the first image information is part of one or more data signals received from the first subset of the one or more image sensors; and the program further includes instructions to perform pre-processing on the one or more data signals prior to causing the first one or more AI models to process the first image information.

7. The rotorcraft of claim 1, wherein initiating, in response to detecting the one or more first image objects from the first image information, further analysis of the object information comprises providing the object information to collision avoidance logic to facilitate avoiding, based on the object information, a collision of the rotor blade with the one or more first physical objects.

8. The rotorcraft of claim 1, wherein the first image information corresponds to a plurality of images captured by the first subset of the one or more image sensors.

9. A method, comprising:

accessing image information generated by one or more image sensors configured to generate the image information for a surrounding environment of a rotorcraft;

causing one or more artificial intelligence (AI) models to process the image information to generate proximity information for the image information, the proximity information comprising depth measurements for one or more image objects from the image information that correspond to one or more physical objects in the surrounding environment of the rotorcraft, wherein the one or more AI models have been trained, according to a training phase, to generate the proximity information, the training phase comprising:

accessing training data that comprises test images that include image objects for potential physical objects that could be present in the surrounding environment of the rotorcraft; and training the one or more AI models using the training data; and initiating, in response to generating the proximity information from the image information, further analysis of the proximity information for the one or more image objects to facilitate avoiding, based on the proximity information, a collision of a rotor blade of the rotorcraft with the one or more physical objects that correspond to the one or more image objects.

10. The method of claim 9, further comprising executing the training phase for training the one or more AI models to generate the proximity information, the training phase comprising:

accessing the training data that comprises test images that include image objects for potential physical objects that could be present in the surrounding environment of the rotorcraft; and training the one or more AI models using the training data.

11. The method of claim 10, wherein the training data is collected from a plurality of test rotorcraft operations, the test rotorcraft operations being actual rotorcraft operations or simulated rotorcraft operations.

12. The method of claim 9, wherein:

a first AI model of the one or more AI models is a depth estimation model; and causing the one or more AI models to process the image information to generate the proximity information comprises causing the first AI model to determine depth estimates from the image information to determine the depth measurements for the one or more image objects.

13. The method of claim 9, wherein:

a first image sensor of the one or more image sensors has a first field of view;

a second image sensor of the one or more image sensors has a second field of view; and the first image sensor and the second image sensor are oriented such that the first field of view and the second field of view cover at least partially different regions of the surrounding environment of the rotorcraft.

14. The method of claim 9, wherein initiating, in response to generating the proximity information from the image information, further analysis of the proximity information comprises providing the proximity information to collision avoidance logic to facilitate avoiding, based on the proximity information, a collision of the rotor blade with the one or more physical objects.

15. The method of claim 9, wherein the image information corresponds to a plurality of images captured by the one or more image sensors.

16. A system, comprising:

at least one processor; and at least one non-transitory computer-readable storage medium storing at least one artificial intelligence model and storing a program for execution by the at least one processor, the program including instructions to:

access first image information generated by a first subset of one or more image sensors, the first image information for a surrounding environment of a rotorcraft;

cause one or more first artificial intelligence (AI) models to process the first image information to detect one or more first image objects from the first image information that correspond to one or more first physical objects in the surrounding environment of the rotorcraft, the one or more first AI models being configured to generate object information comprising respective image locations and respective object-type classifications for the one or more first image objects detected from the first image information, wherein the first one or more AI models have been trained, according to a training phase, to detect the one or more first image objects, the training phase comprising:

accessing training data that comprises test images that include image objects for potential physical objects that could be present in the surrounding environment of the rotorcraft; and training the first one or more AI models using the training data; and initiate, in response to detecting the one or more first image objects from the first image information, further analysis of the object information for the one or more first image objects to facilitate avoiding, based on the object information, a collision of a rotor blade of the rotorcraft with the one or more first physical objects that correspond to the one or more first image objects.

17. The system of claim 16, wherein the program further includes instructions to execute the training phase for training the first one or more AI models to detect the one or more first image objects, the training phase comprising:

accessing the training data that comprises test images that include image objects for potential physical objects that could be present in the surrounding environment of the rotorcraft; and training the first one or more AI models using the training data.

18. The system of claim 17, wherein the training data is collected from a plurality of test rotorcraft operations, the plurality of test rotorcraft operations being actual rotorcraft operations or simulated rotorcraft operations.

19. The system of claim 16, wherein the instructions to initiate, in response to detecting the one or more first image objects from the first image information, further analysis of the object information comprise instructions to provide the object information to collision avoidance logic to facilitate avoiding, based on the object information, a collision of the rotor blade with the one or more first physical objects that correspond to the one or more first image objects.

20. The system of claim 16, wherein the program further includes instructions to:

access second image information generated by a second subset of the one or more image sensors;

cause a second one or more AI models to process the second image information to generate proximity information for the second image information, the proximity information comprising depth measurements for one or more second image objects from the second image information that correspond to one or more second physical objects in the surrounding environment of the rotorcraft; and provide the proximity information to collision avoidance logic to facilitate avoiding, based on the proximity information, a collision of the rotor blade with the one or more second physical objects.

* * * * *